(12) United States Patent
Bouzguarrou et al.

(10) Patent No.: US 12,411,692 B2
(45) Date of Patent: Sep. 9, 2025

(54) STORAGE OF PREDICTION-RELATED DATA

(71) Applicant: Arm Limited, Cambridge (GB)

(72) Inventors: Houdhaifa Bouzguarrou, Austin, TX (US); Alexander Cole Shulyak, Austin, TX (US); Rami Mohammad Al Sheikh, Morrisville, NC (US)

(73) Assignee: Arm Limited, Cambridge (GB)

( * ) Notice: Subject to any disclaimer, the term of this patent is extended or adjusted under 35 U.S.C. 154(b) by 93 days.

(21) Appl. No.: 18/462,742

(22) Filed: Sep. 7, 2023

(65) Prior Publication Data
US 2025/0085971 A1    Mar. 13, 2025

(51) Int. Cl.
*G06F 9/30* (2018.01)
*G06F 9/32* (2018.01)
*G06F 9/38* (2018.01)

(52) U.S. Cl.
CPC .......... *G06F 9/321* (2013.01); *G06F 9/30058* (2013.01); *G06F 9/325* (2013.01); *G06F 9/3844* (2013.01)

(58) Field of Classification Search
CPC ...... G06F 9/321; G06F 9/30058; G06F 9/325; G06F 9/3844
See application file for complete search history.

(56) References Cited

U.S. PATENT DOCUMENTS

| | | | |
|---|---|---|---|
| 6,006,317 A | 12/1999 | Ramagopal et al. | |
| 6,385,720 B1* | 5/2002 | Tanaka | G06F 9/3844 |
| | | | 712/213 |
| 6,694,425 B1 | 2/2004 | Eickemeyer | |
| 8,078,852 B2* | 12/2011 | Al-Otoom | G06F 9/3848 |
| | | | 712/240 |
| 8,751,776 B2 | 6/2014 | Ukai | |
| 9,639,368 B2* | 5/2017 | Bonanno | G06F 9/3844 |
| 9,891,918 B2 | 2/2018 | Hooker et al. | |
| 9,973,187 B1 | 5/2018 | Pant et al. | |
| 10,223,123 B1 | 3/2019 | Blasco et al. | |
| 10,846,097 B2 | 11/2020 | Jumani et al. | |
| 10,915,322 B2* | 2/2021 | Annamalai | G06F 1/3206 |
| 11,334,361 B2 | 5/2022 | Ishii et al. | |

(Continued)

OTHER PUBLICATIONS

U.S. Appl. No. 17/851,266, filed Jun. 28, 2022, Shulyak et al.
U.S. Appl. No. 18/312,052, filed May 4, 2023, Shulyak et al.
U.S. Appl. No. 18/454,158, filed Aug. 23, 2023, Bouzguarrou et al.
U.S. Appl. No. 18/454,165, filed Aug. 23, 2023, Bouzguarrou et al.

(Continued)

*Primary Examiner* — Corey S Faherty
(74) *Attorney, Agent, or Firm* — NIXON & VANDERHYE P.C.

(57) ABSTRACT

A data processing apparatus includes pointer storage configured to store pointer values for pointers. Increment circuitry, responsive to one or more increment events, increments each of the pointer values in dependence on a corresponding live pointer value update condition from corresponding live pointer value update conditions. The corresponding live pointer value update condition is different for each of the pointers. History storage circuitry stores resolved behaviours of instances of a control flow instruction, each of the resolved behaviours being associated with one of the pointers. At least one of the live pointer value update conditions is changeable at runtime. Consequently, storage can be reduced as compared to a situation where all pointer value update conditions are active.

20 Claims, 19 Drawing Sheets

(56) References Cited

U.S. PATENT DOCUMENTS

| | | | |
|---|---|---|---|
| 11,983,533 B2* | 5/2024 | Pusdesris | G06F 9/30058 |
| 2004/0255104 A1 | 12/2004 | Akkary et al. | |
| 2005/0138480 A1 | 6/2005 | Srinivasan et al. | |
| 2011/0238917 A1 | 9/2011 | Lin | |
| 2016/0092230 A1 | 3/2016 | Chen | |
| 2016/0350116 A1 | 12/2016 | Reddy et al. | |
| 2017/0010820 A1 | 1/2017 | Day | |
| 2018/0088953 A1 | 3/2018 | Lin | |
| 2020/0050459 A1 | 2/2020 | Palivela | |
| 2020/0104137 A1 | 4/2020 | Natarajan | |
| 2020/0174794 A1 | 6/2020 | Golla | |
| 2021/0081575 A1 | 3/2021 | Saileshwar | |
| 2021/0124586 A1 | 4/2021 | Bouzguarrou | |
| 2021/0240476 A1 | 8/2021 | Kountanis | |
| 2022/0197650 A1 | 6/2022 | Soundararajan | |
| 2023/0057600 A1 | 2/2023 | Malley | |

OTHER PUBLICATIONS

Office Action dated Aug. 9, 2023 for U.S. Appl. No. 17/851,266, 11 pages.

Akkary, H. et al. "Recycling Waste: Exploiting Wrong-Path Execution to Improve Branch Prediction" ICS'03, Jun. 23-26, 2003, pp. 12-21 (10 pages).

Mutlu, O. et al. "On Reusing the Results of Pre-Executed Instructions in a Runahead Execution Processor" IEEE Computer Architecture Letters, 2005, vol. 4 (4 pages).

Notice of Allowance dated Aug. 22, 2024 for U.S. Appl. No. 18/312,052, 15 pages.

Office Action dated May 6, 2025 for U.S. Appl. No. 18/454,165, 19 pages.

Zi-Chao Xie et al., "SWIP Prediction: Complexity-Effective Indirect-Branch Prediction Using Pointers" Journal of Computer Science and Technology, vol. 27, No. 4, Jul. 2012, pp. 754-768.

* cited by examiner

```
for (i = 0; i < N; i++){
        if (hard_to_predict){          // Branch A
                if (data[i]){          // Branch B
                        ...
                }
        }
}
```

FIG. 2

```
if (long_latency_hard_to_predict){
        ...
} if (short_latency_hard_to_predict){
        ....
}
```

FIG. 3

```
for (i=0; i < N; i++){
        if (long_latency_hard_to_predict){      // Branch A
                ...
        } if (short_latency_hard_to_predict){     // Branch B
                ...
        }
}
```

FIG. 4A short[i=0] = T     long[i=0] = T
short[i=1] = T     long[i=1] = N*
short[i=2] = N     long[i=2] = ?
short[i=3] = T     long[i=3] = ?

FIG. 4B

```
for (i=0; i < N; i++){
        for (j=0; j < N; j++){    // Loop iteration count hard to predict
                ...
        }
}
if (hard_to_predict){              // Branch A
        ...
}
```

FIG. 5

Update_condition[0] = 1'b1

Update_condition[1] = 1'b0

Update_condition[2] = ^pc[0, 4, 8, 12, 16, 20, 24, 28 ..]

Update_condition[3] = ^pc[1, 5, 9, 13, 17, 21, 25, 29 ..]

Update_condition[4] = ^pc[2, 6, 10, 14, 18, 22, 26, 30 ..]

Update_condition[5] = ^pc[3, 7, 11, 15, 19, 23, 27, 31 ..]

Update_condition[9:6] = ~idx[5:2]

Update_condition[10] = ^pc[0, 3, 6, 9, 12, 15, 18, 21 ..]

Update_condition[11] = ^pc[1, 4, 7, 10, 13, 16, 19, 22 ..]

Update_condition[12] = ^pc[2, 5, 8, 11, 14, 17, 20, 23 ..]

Update_condition[15:13] = ~idx[12:10]

Update_condition[16] = ^pc

Update_condition[17] = ~idx[16]

FIG. 16

STORAGE OF PREDICTION-RELATED DATA

TECHNICAL FIELD

The present technique relates to the area of data processing, and more particularly to control flow prediction.

DESCRIPTION

It is desirable to keep the amount of data needed to perform predictions (such as for control flow instructions) low.

SUMMARY

Viewed from a first example configuration, there is provided a data processing apparatus comprising: pointer storage configured to store pointer values for a plurality of pointers; increment circuitry, responsive to one or more increment events, to increment each of the pointer values in dependence on a corresponding live pointer value update condition from a plurality of corresponding live pointer value update conditions, wherein the corresponding live pointer value update condition is different for each of the pointers; and history storage circuitry configured to store resolved behaviours of instances of a control flow instruction, each of the resolved behaviours being associated with one of the pointers, wherein at least one of the live pointer value update conditions is changeable at runtime.

Viewed from a second example configuration, there is provided a data processing method comprising: storing pointer values for a plurality of pointers; responding to one or more increment events by incrementing each of the pointer values in dependence on a corresponding live pointer value update condition from a plurality of corresponding live pointer value update conditions, wherein the corresponding live pointer value update condition is different for each of the pointers; and storing resolved behaviours of instances of a control flow instruction, each of the resolved behaviours being associated with one of the pointers, wherein at least one of the live pointer value update conditions is changeable at runtime.

Viewed from a third example configuration, there is provided a non-transitory computer-readable medium to store computer-readable code for fabrication of a data processing apparatus comprising: pointer storage configured to store pointer values for a plurality of pointers; increment circuitry, responsive to one or more increment events, to increment each of the pointer values in dependence on a corresponding live pointer value update condition from a plurality of corresponding live pointer value update conditions, wherein the corresponding live pointer value update condition is different for each of the pointers; and history storage circuitry configured to store resolved behaviours of instances of a control flow instruction, each of the resolved behaviours being associated with one of the pointers, wherein at least one of the live pointer value update conditions is changeable at runtime.

Viewed from a fourth example configuration, there is provided a system comprising: the data processing apparatus, implemented in at least one packaged chip; at least one system component; and a board, wherein the at least one packaged chip and the at least one system component are assembled on the board.

Viewed from a fifth example configuration, there is provided a chip-containing product comprising the system assembled on a further board with at least one other product component.

BRIEF DESCRIPTION OF THE DRAWINGS

The present invention will be described further, by way of example only, with reference to embodiments thereof as illustrated in the accompanying drawings, in which:

FIG. 2 illustrates an example of a guard instruction;

FIG. 3 illustrates an example of hard to predict instructions having different latencies;

FIG. 4A shows an example in which a FOR loop contains a long latency branch instruction and a short latency branch instruction, whilst FIG. 4B shows the corresponding storage that can be used to perform replay prediction;

FIG. 5 shows how FOR loop indexing can be polluted;

FIG. 16 illustrates a set of pointer update conditions;

DESCRIPTION OF EXAMPLE EMBODIMENTS

Figure 1:
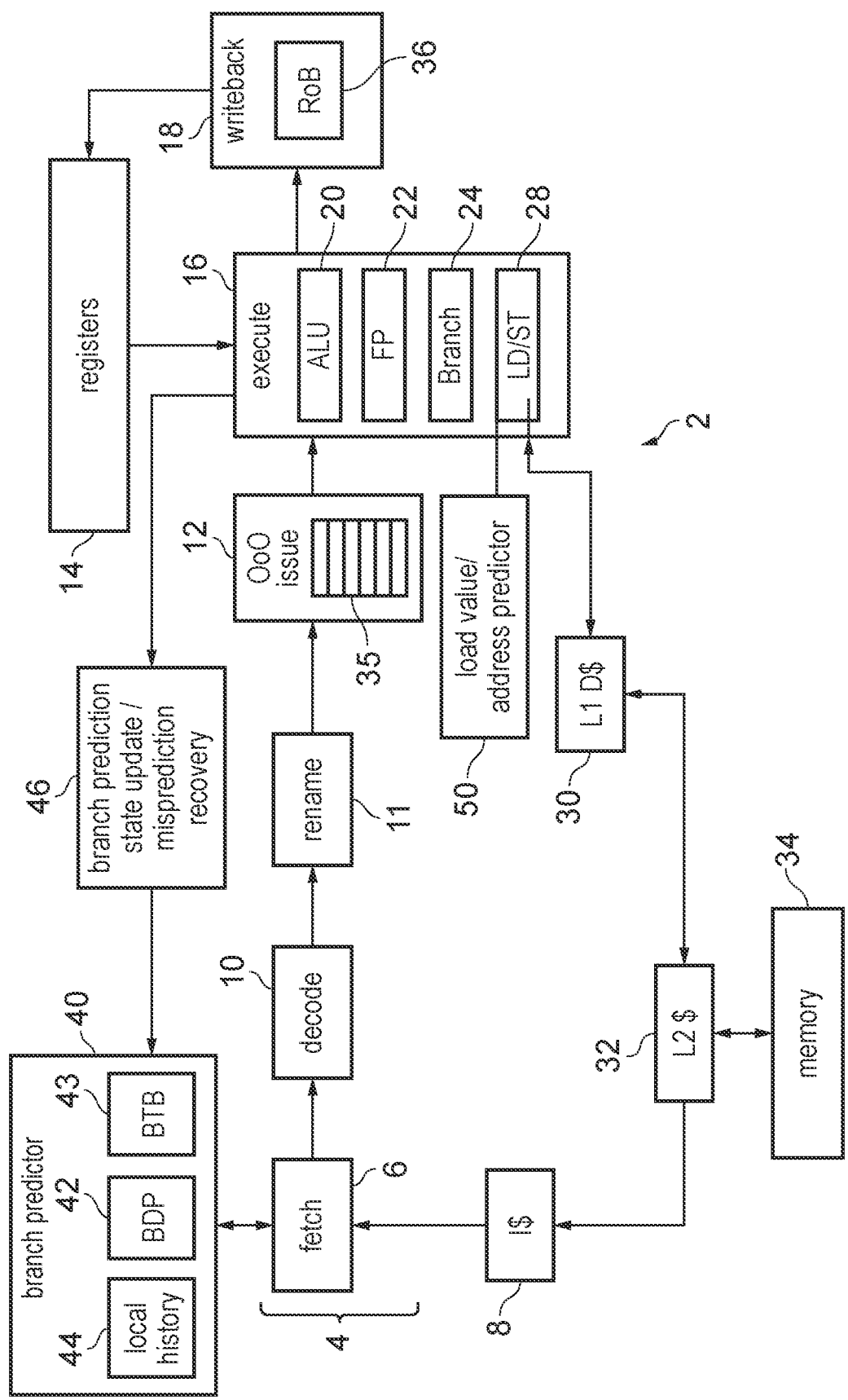
FIG. 1 schematically illustrates an example of a data processing apparatus.

Before discussing the embodiments with reference to the accompanying figures, the following description of embodiments is provided.

In accordance with one example configuration there is provided a data processing apparatus comprising: pointer storage configured to store pointer values for a plurality of pointers; increment circuitry, responsive to one or more increment events, to increment each of the pointer values in dependence on a corresponding live pointer value update condition from a plurality of corresponding live pointer value update conditions, wherein the corresponding live pointer value update condition is different for each of the pointers; and history storage circuitry configured to store resolved behaviours of instances of a control flow instruction, each of the resolved behaviours being associated with one of the pointers, wherein at least one of the live pointer value update conditions is changeable at runtime.

Each pointer has a live pointer update condition, which is different for each pointer. In this way, the conditions on which each pointer increments are different, and each pointer may increment at a different rate. Each of the pointers can therefore be filtered differently, which makes it possible to obtain a pointer where the circumstances on which it increments omits certain undesirable resolved behaviours. For instance, where the increment event is the occurrence of a branch instruction and there is no live pointer value update condition, resolved behaviour of every encountered branch instruction is stored. In contrast, by providing different live pointer value update conditions, the resolved behaviours of some branch instructions might be omitted from the storage. Each pointer value will store different sets of resolved behaviours, despite having encountered the same branch instructions. The live pointer value update conditions can be changed during runtime (either explicitly or implicitly). It is therefore possible to change (during runtime) the nature of resolved behaviours of instances of control flow instructions (e.g. to those that are most useful for prediction). This reduces the storage requirements and the speed at which the incrementing process takes place. In some examples, the increment circuitry may increment pointers relating to the live pointer value update conditions rather than pointers relating to non-live (suspended) pointer value update conditions. Indeed, in some situations non-live (suspended) pointer values may not be stored. The history storage circuitry might be, e.g. a tagged/shared cache, a history vector in the prediction circuitry, etc.

In some examples, at least one other of the live pointer value update conditions is immutable at runtime. These live pointer value update conditions are therefore always present. In general, these live pointer value update conditions are ones that have a high likelihood of being useful.

In some examples, the at least one of the live pointer value update conditions is based on a program counter value. That is, the program counter value associated with an increment event indicates whether a resolved behaviour is stored.

In some examples, the at least one of the live pointer value update conditions is based on the current program counter value matching a corresponding pattern. For example, the conditions might be based on a hash of a program counter value such as by looking at a number of the least significant bits of the program counter value. Resolved behaviours of instructions can therefore be included or not included based on the program counter value such that in different sets 'every instruction' or 'every other instruction' or 'every third instruction' etc. is stored.

In some examples, the at least one of the live pointer value update conditions is changed by changing the corresponding pattern. The pointer value update condition can therefore be changed by changing the pattern of the program counter value that is matched for an update to take place (e.g. for the resolved outcome of the instruction to be stored).

In some examples, the one or more increment events comprise a backwards taken branch. A backwards taken branch can be considered to be a branch instruction (a type of control flow instruction) in which the flow of control goes backwards. That is, as part of the branch, the program counter value decreases. A backwards taken branch is usually indicative of a loop instruction in which a series of instructions is executed and a counter (that increments at each iteration) is compared to a static value that dictates the number of times the instructions are to be executed. Depending on a result of that comparison (e.g. if the counter is less than the static value), a branch back to the start of the instructions takes place. In contrast, if the comparison fails then execution continues with the next instruction (the branch is not taken). The filtering of such loops is important because they can cause instability in the branch history. For instance, if an outer loop contains an inner loop with the inner loop executing a random number of times then the branch history for the outer loop will vary randomly. This can make it very difficult to use the branch history to predict the behaviour of the outer loop (or indeed, of other instructions). By filtering out some backwards taken branches, it is possible that the polluting inner branch instruction will be filtered out and its resolved behaviour will not be stored. This leads to a more stable branch history that can then be used to produce predictions with higher accuracy. By providing a number of pointers, each with different update conditions, it is hoped that one of the pointers will provide history that excludes polluting instructions. However, in practice, using a large number of pointers can be expensive in terms of storage and execution time (particularly when a misprediction occurs, requiring a rewind). Consequently, by making it possible to control which pointers are active at a particular moment, it is possible to implement only pointers that are proven to be useful. This may change over time and so the series of useful pointers may be continually changing.

In some examples, the live pointer value update condition is based on a type of the backwards taken branch. The update condition may depend on a type of the instruction. For instance, one pointer could increment on direct conditional branch instructions and another pointer could increment on indirect conditional branch instructions (again with the resolved behaviour being stored when the pointer value changes).

In some examples, the data processing apparatus comprises: counter storage circuitry configured to store confidence values, each of the confidence values corresponding with one of the live pointer value update conditions, wherein each of the at least some of the live pointer value update conditions are changed in dependence on its corresponding confidence value. One way to determine which of the live pointer value update conditions is successful is to measure a confidence with each live pointer value update condition. As a confidence associated with the update condition increases, the likelihood with which it is changed may decrease. The confidence could therefore represent the likelihood that the resolved behaviour associated with that pointer value is useful for other predictions (e.g. control flow instruction predictions).

In some examples, each of the at least some of the live pointer value update conditions are changed in dependence on its corresponding confidence value being less than a predetermined limit after a predetermined period. If the confidence value is low after the predetermined period then the associated update condition may be changed (e.g. by changing the program counter match that is required).

In some examples, each of the at least some of the live pointer value update conditions are changed as a consequence of being in a smallest N of the confidence values stored in the counter storage circuitry. N is an integer greater than or equal to 1. In some embodiments, N is less than the maximum number of dynamic pointer value update conditions (or pointers) that are active at once. In this way, the pointer value update conditions that are good are kept, while the worst performing (MAX-N) conditions (pointers) are swapped out thereby giving another pointer value update condition (pointer) a chance to be selected. Over time, this allows all pointer value update conditions to be tested with the (MAX-N) best ones being kept in order to provide a good overall performance.

In some examples, the data processing apparatus comprises: prediction circuitry, responsive to a prediction trigger associated with a replay of a given instance of a given control flow instruction, to select a subset of resolved behaviour associated with one of the pointer values to make a prediction of a given instance of the given control flow instruction. As previously alluded to, subsets of the resolved behaviours can be used to make a prediction of a control flow instruction (e.g. an outcome of the control flow instruction, a target of a control flow instruction, or even the presence of a control flow instruction in a block of instructions). In other embodiments, a prediction could be made in respect of a data value and in other embodiments, subsets of the resolved behaviours could be used for something other than a prediction.

In some examples, the data processing apparatus comprises: training circuitry configured, in response the subset of resolved behaviour being used to make the prediction, to increment its corresponding confidence value. The confidence value in these examples illustrates the number of times that one of the subsets is selected as the basis to make a prediction. For example, each time a subset of the resolved behaviours is selected as a final basis to make a prediction for a control flow instruction, the confidence value associated with that subset (and associated with the pointer for that subset) is incremented.

In some examples, the live pointer value update conditions and at least one suspended pointer value update conditions form a superset of available pointer value update conditions; and the at least one of the live pointer value update conditions is changeable to one of the at least one suspended pointer value update conditions. The set of pointer value update conditions can therefore be fixed to a fixed set of possibilities, of which a subset is selected to form the live pointer value update conditions.

In some examples, the data processing apparatus comprises: recovery circuitry configured to recover a previous value of the pointer values for each of the live pointer value update conditions, wherein the history storage circuitry is configured to store the previous value of the pointer values for each of the live pointer value update conditions. During execution of control flow instructions for which a prediction has been made, it may transpire that the prediction was wrong. For instance, a branch was taken when it was predicted not to be taken, a branch did not contain a branch instruction when it was predicted to do so, or that the target for a branch instruction was predicted to be one thing and it was actually something else. In these situations, it may be necessary for a 'rewind' to take place, in which execution is rewound to the mispredicted instruction—with the correct behaviour then being followed from that point forward.

When this happens, it is also necessary for the pointer values to be updated as well, in order to reflect their values at the time of the mispredicted instruction. As a consequence the sets of behaviour that are currently available for predictions are also changed. There are a number of techniques for doing this. For instance, the recovery circuitry might store a number of 'snapshots' of the pointer values, together with a number of deltas between the snapshots. In some examples, the history storage circuitry may only store the previous value of the pointer values for each of the live pointer value update conditions. That is, previous values of pointer values that relate to suspended pointer value update conditions may not be stored. In some examples, any such pointer values that are already stored may or may not be erased.

In some examples, the data processing apparatus comprises: inference circuitry configured to infer an inferred pointer value from an inferring pointer value corresponding to one of the live pointer value update conditions. Although a specific pointer value for a pointer value update condition may not be stored, it might be possible for that pointer value to be inferred from another pointer value that is stored. This can be used in combination with the inference circuitry to recover previous values of the pointer values without the history of those pointer values being stored.

In some examples, the inferred pointer value corresponds with one of the pointer value update conditions that is an inverse of the one of the live pointer update conditions. An inference is particularly possible where the update conditions are inverses of each other. For instance, if a pair of update conditions are mutually exclusive, then one of them may be inferable from the other. This can be achieved by looking at the total number of increment events and subtracting an live pointer value to obtain an inactive (e.g. non stored) pointer value.

Particular embodiments will now be described with reference to the figures.

FIG. 1 schematically illustrates an example of a data processing apparatus 2. The data processing apparatus 2 has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; a register renaming stage 11 for mapping architectural registers specified by program instructions or micro-operations to physical register specifiers identifying physical registers in a register file 14; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 28 for performing load/store operations to access data in a memory system 8, 30, 32, 34.

In this example, the memory system includes a level one data cache 30, a level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

The processor shown in FIG. 1 is an out-of-order processor where the pipeline 4 includes a number of features supporting out-of-order processing. This includes the issue stage 12 having an issue queue 35 for queuing instructions and issue control circuitry which is able to issue a given instruction for execution if its operands are ready, even if an earlier instruction in program order has not issued yet. Also the writeback stage 18 may include a reorder buffer (ROB) 36 which tracks the execution and the commitment of different instructions in the program order, so that a given instruction can be committed once any earlier instructions in program order have themselves be committed. Also, the register renaming stage 11 helps to support out of order processing by remapping architectural register specifiers specifying the instructions decoded by the decode stage 10 to physical register specifiers identifying physical registers 14 provided in hardware. The instruction encoding may only have space for register specifiers of a certain limited number of bits which may restrict the number of architectural registers supported to a relatively low number such as 16 or 32. This may cause register pressure, where after a certain number of instructions have been processed a later instruction which independent of an earlier instruction which references a particular register needs to reuse that register for storing different data values. In an in-order processor, that later instruction would need to wait until the earlier reference to the same register has completed before it can proceed, but these register dependencies caused by insufficient number of architectural registers can be avoided in an out-of-order processor by remapping the references to the same destination register in different instructions to different physical registers within the register file 14, which may comprise a greater number of physical registers than the number of architectural registers supported in the instruction encoding. This can allow a later instruction which writes to a particular architectural register to be executed while an earlier instruction which writes to the same architectural register is stalled, because those register references are mapped to different physical registers in the register file 14. It will be appreciated that other features may support out of order processing.

As shown in FIG. 1, the apparatus 2 has a number of prediction mechanisms for predicting instruction behaviour for instructions at particular instruction addresses. For example, these prediction mechanisms may include a branch predictor 40 and a load value or load address predictor 50. It is not essential for processors to have both forms of predictor. The load value or load address predictor is provided for predicting data values to be loaded in response to load instructions executed by the load/store unit 28 and/or predicting load addresses from which the data values are to be loaded before the operands for calculating the load addresses have been determined. For example, the load value prediction may record previously seen values loaded from a particular address, and may predict that on subsequent instances of loading from that address the value is expected to be the same. Also, the load address predictor may track history information which records observed stride patterns of address accesses (where the addresses of successive loads differ by a constant offset) and then use that observed stride pattern to predict the address of a future load instructions by continuing to add offsets to the latest seen address at intervals of the detected stride.

Also, the branch predictor 40 may be provided for predicting outcomes of branch instructions, which are instructions which can cause a non-sequential change of program flow. Branches may be performed conditionally, so that they may not always be taken. The branch predictor is looked up based on addresses of instructions provided by the fetch stage 6, and provides a prediction of whether those instruction addresses are predicted to correspond to branch instructions. For any predicted branch instructions, the branch predictor provides a prediction of their branch properties such as a branch type, branch target address and branch direction (branch direction is also known as predicted branch outcome, and indicates whether the branch is predicted to be taken or not taken). The branch predictor 40 includes a branch target buffer (BTB) 43 for predicting properties of the branches other than branch direction, and a branch direction predictor (BDP) 42 for predicting the not taken/taken outcome of a branch (branch direction). It will be appreciated that the branch predictor could also include other prediction structures, such as a call-return stack for predicting return addresses for function calls, a loop direction predictor for predicting when a loop controlling instruction will terminate a loop, or other specialised types of branch prediction structures for predicting behaviour of branches in specific scenarios. The BTB 43 may have any known BTB design and will not be described in detail here. In general the BTB may act as a cache correlating particular instruction addresses with sets of one or more branch properties such as branch type or the branch target address (the address predicted to be executed next after the branch if the branch is taken), and may also provide a prediction of whether a given instruction address is expected to correspond to a branch at all.

The branch direction predictor 42 may be based on a variety of (or even multiple) different prediction techniques, e.g. a TAGE predictor and/or a perceptron predictor, which includes prediction tables which track prediction state used to determine whether, if a given instruction address is expected to correspond to a block of instructions including a branch, whether that branch is predicted to be taken or not taken. The BDP 42 may base its prediction on local history records tracked in local history storage circuitry 44. In the present techniques, one of the prediction techniques that is used is a replay predictor in which the previous execution of an instruction that is subsequently rewound can be used as a basis for predicting the outcome of its re-execution.

The apparatus 2 may have branch prediction state updating circuitry and misprediction recovery circuitry 46, which updates state information within the branch predictor 40 based on observed instruction behaviour seen at the execute stage 16 for branch instructions executed by the branch unit 24. When the branch instruction is executed and the observed behaviour for the branch matches the prediction made by the branch predictor 40 (both in terms of whether the branch is taken or not and in terms of other properties such as branch target address) then the branch prediction state updating circuitry 46 may update prediction state within the BDP 42 or the BTB 43 to reinforce the prediction that was made so as to make it more confident in that prediction when that address is seen again later. Alternatively, if there was no previous prediction state information available for a given branch then when that branch is executed at the execute stage 16, its actual outcome is used to update the prediction state information. Similarly, the local history storage 44 may be updated based on an observed branch outcome for a given branch. On the other hand, if a misprediction is identified when the actual branch outcome 24 differs from the predicted branch outcome in some respect, then the misprediction recovery portion of the state updating/misprediction recovery circuitry 46 may control updating of state within the branch predictor 40 to correct the prediction state so that it is more likely that the prediction will be correct in future. In some cases, a confidence counter-based mechanism may be used so that one incorrect prediction does not necessarily overwrite the prediction state which has previously been used to generate a series of correct predictions, but multiple mispredictions for a given instruction address will eventually cause the prediction state to be updated so that the outcome actually being seen at the execute stage 60 is predicted in future. As well as updating the state information within the branch predictor 40, on a misprediction, the misprediction recovery circuitry may also cause instructions to be flushed from the pipeline 4 which are associated with instruction addresses beyond the address for which the misprediction was identified, and cause the fetch stage 6 to start refetching instructions from the point of the misprediction.

Selecting entries of the BDP 42 based on instruction address alone may not give accurate predictions in all cases, because it is possible that the same instruction address could be reached by different paths of program flow depending on outcomes of previous instructions, and depending on the path taken to reach the current instruction, this may lead to different actual instruction behaviour for the same instruction address.

One solution to this is to select predictions based on history information which tracks a sequence of previously seen instruction behaviour. Global history can be used as the branch history format. In particular, a sequence of taken and not taken outcomes for a series of branches can be tracked. The outcome of other branch instructions can then be correlated with the current branch history over time, in order to enable future predictions to be made.

A downside to this approach is that the same global history might be seen for multiple branch instructions. For instance, the sequence NNTTTNNT (assuming a global history of 8 branch instructions is considered) might be encountered for two branch instructions at completely different addresses. In this situation, it is unlikely that there would be any correlation between the outcome of the two distant branch instructions even though the global history technically matches.

Another possibility might be to use local history, which involves correlating the outcome of a branch instruction to the global history seen at that branch instruction (i.e., the history local to that branch instruction). This solution can work well. However, it can require maintaining a large amount of data for each branch instruction. For instance, since each branch instruction might be encountered with different frequencies and along different paths, it may be necessary to track the history multiple times-once for each branch instruction. A further difficulty with using local history is that in many cases, the local history might not be relevant. For instance, consider the situation illustrated in FIG. 2. Here, branch A acts as a guard for branch B. In other words, branch B is only encountered dependent on the outcome of branch A. The outcome of branch A forms part of the local history of branch B. However, this information is irrelevant because the entry in the local history for branch A will always be the same value.

Separately to this, it is also desirable to enable replay prediction. In a speculative out-of-order processor, instructions can be executed in an order other than how they appear in the program itself in order to improve overall efficiency of execution. In such situations, some later branch instructions might resolve while the result of an earlier branch instruction is waiting for resolution. For instance, in the example of FIG. 3, the short latency hard to predict condition might be expected to resolve before the long latency hard to predict condition is resolved. Under normal circumstances, if the long latency instruction was mispredicted then a 'rewind' occurs that causes the program to revert to the state that it was in at the time the long latency instruction was executed. This is done in order to prevent the wrong execution path being taken. However, as a consequence of this, the prediction and outcome data generated for the short latency instruction is lost. In practice, however, since execution of the short latency instruction is not dependent on the long latency instruction, the previous execution of that instruction is likely to be a very good guide as to how the instruction will execute when it is reexecuted. Hence, it would be beneficial for the result of executing the short latency instruction to be kept (despite the rewind) in order to be available for a future 'replay prediction'. Note, however, that history-based predictors may not be able to help with such replays. This is because the history taken to get to the short latency instruction will be different between the two executions due to the misprediction. In particular, the long latency instruction is taken in one execution and not taken in the other. With differing history information, it is difficult if not impossible to form a prediction of the short latency instruction.

In accordance with the techniques described herein, a mechanism is used that makes it possible to index previous behaviours of a branch instruction according to indexes of FOR loops within the program. Each instance of a given instruction can therefore be individually recognised (a branch instruction that occurs outside a FOR loop simply has an index of 0). If the same iteration/index is encountered again in the future (e.g. due to a replay that occurs after a rewind due to a misprediction event) then the previous behaviour of that branch instruction for that iteration/index can be used as the prediction for the direction in which the branch instruction will go.

An example of this is illustrated in FIGS. 4A and 4B. FIG. 4A shows an example in which a FOR loop contains a long latency branch instruction and a short latency branch instruction. In this example, it is assumed that a misprediction occurs with the second iteration (i=1) of the long latency instruction. That is to say that a prediction is made for one direction and on resolution it is determined that the prediction was incorrect. However, because the long latency instruction is followed by a short latency instruction and because these can be performed out of order, the situation arises in which several further executions of later iterations of the short latency instruction are made before the second iteration of the long latency instruction is resolved thereby revealing the misprediction and resulting in a rewind. In these situations, it would be desirable to store the results of those executions to form the basis of future predictions.

FIG. 4B shows the storage of the data. As described earlier, the indexing is carried out based on the index of the FOR loop. Due to the difference in latencies, more (4) executions of the short latency instruction are made as compared to the long latency instruction (2). When the rewind occurs, the program returns to the second iteration (i=1) of the loop and the long latency instruction is taken (rather than not taken, which was the incorrect prediction). However, the executions performed for the third and fourth iterations (i=3 and i=4) of the short latency instruction remain stored. Then, when the third and fourth iterations are reached for the second time, the previous executions of those iterations can form the basis of predictions for the short latency branch instruction.

A difficulty with this approach is aligning the indexing of the branch behaviour with the index of the FOR loop. In particular, at the time of instruction execution there may be nothing to distinguish a FOR loop from any other branch instruction. Even then, it may not be immediately obvious how to determine which variable (e.g., which value in which register) is used as the index for the FOR loop. One approach to solving this problem is to count backwards taken branches (i.e., instructions where the value of the program counter has decreased as compared to its previous value) and to use this as the index. A loop such as a FOR loop will contain a backwards taken branch at the end of the main body. By keeping a running count of such branches through execution of the program, it is possible to unique identify each instance of each instruction.

However, even this approach is not without difficulty. In particular, such a pointer can become polluted. For example, consider the situation shown in FIG. 5. Here, an outer FOR loop is present, which contains an inner FOR loop, whose index is hard to predict. Indeed, the iteration count might always be different (or could even be random). By the time branch A is reached, the backwards taken branch pointer could point to a variety of locations. Consequently, the index at which the behaviour of branch A is stored may have no relation to the index of the outer FOR loop. This therefore makes any replay impractical since it is very difficult to determine the previous behavioural execution of branch A for a given iteration of the outer FOR loop.

In accordance with the techniques described herein, this problem is alleviated by providing a plurality of pointers. Not every pointer is updated at every backwards taken branch instruction. In some cases, some pointers could be updated with every backwards taken branch instruction. Other pointers could be updated only every M backwards taken branch instructions. Some backwards taken branch instructions might update multiple (or even all) pointers. By maintaining a number of pointers, each of which is updated differently, it is expected that one of the pointers will be incremented in correspondence with the FOR loop index.

Figure 6:
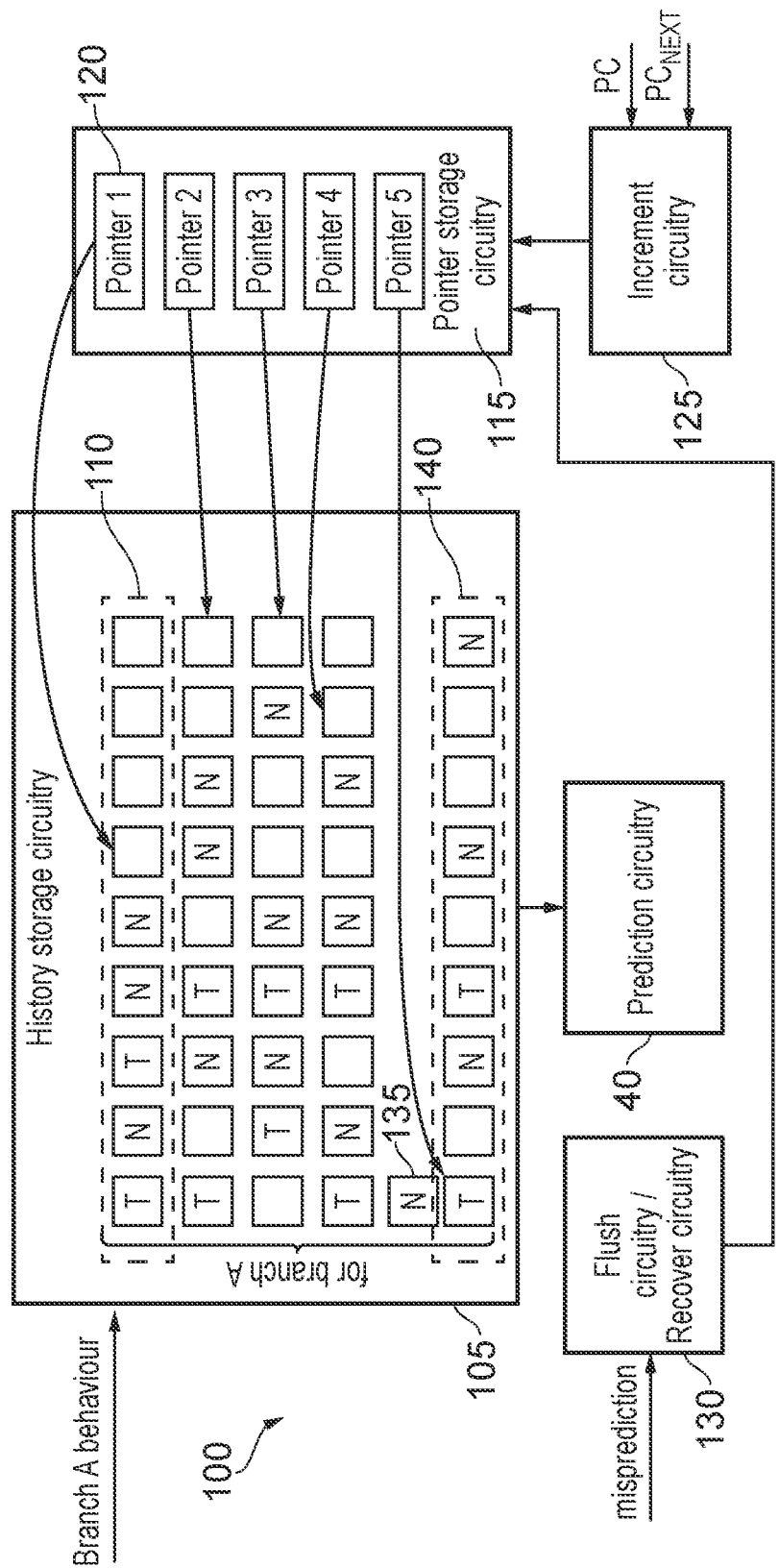
FIG. 6 schematically illustrates an example of a data processing apparatus.

FIG. 6 illustrates an example of a data processing apparatus 100 in accordance with some examples. The data processing apparatus 100 includes history storage circuitry 105. This stores six sets 110 of behaviours of instances of a control flow instruction that are usable to predict the behaviour of that control flow instruction (branch A) during a replay situation. It will be appreciated that multiple pluralities of sets may be provided—each for a different control flow instruction. Pointer storage circuitry 115 is provided that stores a plurality of pointers 120, with each of the pointers 120 being associated with one of the sets 110 of behaviours. The pointer is used to index entries into the sets. That is, each pointer indicates where a next entry into the associated set should be stored. In this example, the actual behaviours are the same, but the set of behaviours differs due to the indexing. In this example, the behaviours are (in order) TNTNN. However, the sets differ because in some instances, there are gaps between some of the behaviours. The differences in the behaviours arise due to differences in how the pointers 120 in the pointer storage circuitry 115 are updated by the increment circuitry 125. In particular, the increment circuitry receives a current program counter value (PC) and the program counter value of a next instruction ($PC_{NEXT}$). If $PC_{NEXT}$ is less than or equal to PC, then the current instruction is a backwards taken branch and one or more of the pointers are updated.

Two special sets 135, 140 may be stored for each control flow instruction. The first of these sets 135 tracks only the most recent prediction that has been made for the control flow instruction. The second set 140 has its pointer incremented for all backwards taken control flow instructions.

Prediction circuitry 40 is provided to make a prediction of the future behaviour of the control flow instruction (e.g. branch A) based on one of the sets. It is hoped that the set that would be selected is one that corresponds with the FOR loop. A training process can be performed to determine which set of behaviours to use. With one of the set having been selected, the corresponding pointer is used to index into that set. If a previous behaviour is stored then this can be used to form the basis of the prediction for the control flow instruction. Otherwise, more common prediction techniques can be used. That is, if one set 110 has been selected and if the corresponding pointer 120 currently refers to index '3' then it is determined whether the set 110 has an entry at index 3. If so, then a previous execution of the branch A at this iteration has occurred and the behaviour (T) can be used to predict how branch A will perform again (e.g. it will be taken). If the entry is empty then no previous behaviour has been recorded for the current iteration and so no prediction is made in this way. Other prediction techniques can be used instead.

Finally in FIG. 6, flush circuitry and recover circuitry 130 (which are shown as a single device) are provided. In response to a misprediction on a control flow instruction, this causes a flush of the pipeline to occur. As part of this process, the values of the pointers 120 are reset to a value that they had at the time of the mispredicted instruction being issued. However, the contents of the history storage circuitry 105 are not touched as a consequence of the flush. That is the flush itself does not count as a backwards taken branch instruction and the behaviours of the instructions that follow the mispredicted instruction are not erased from the history storage circuitry 105 and thus can be used to form the basis of a later prediction.

Figure 7:
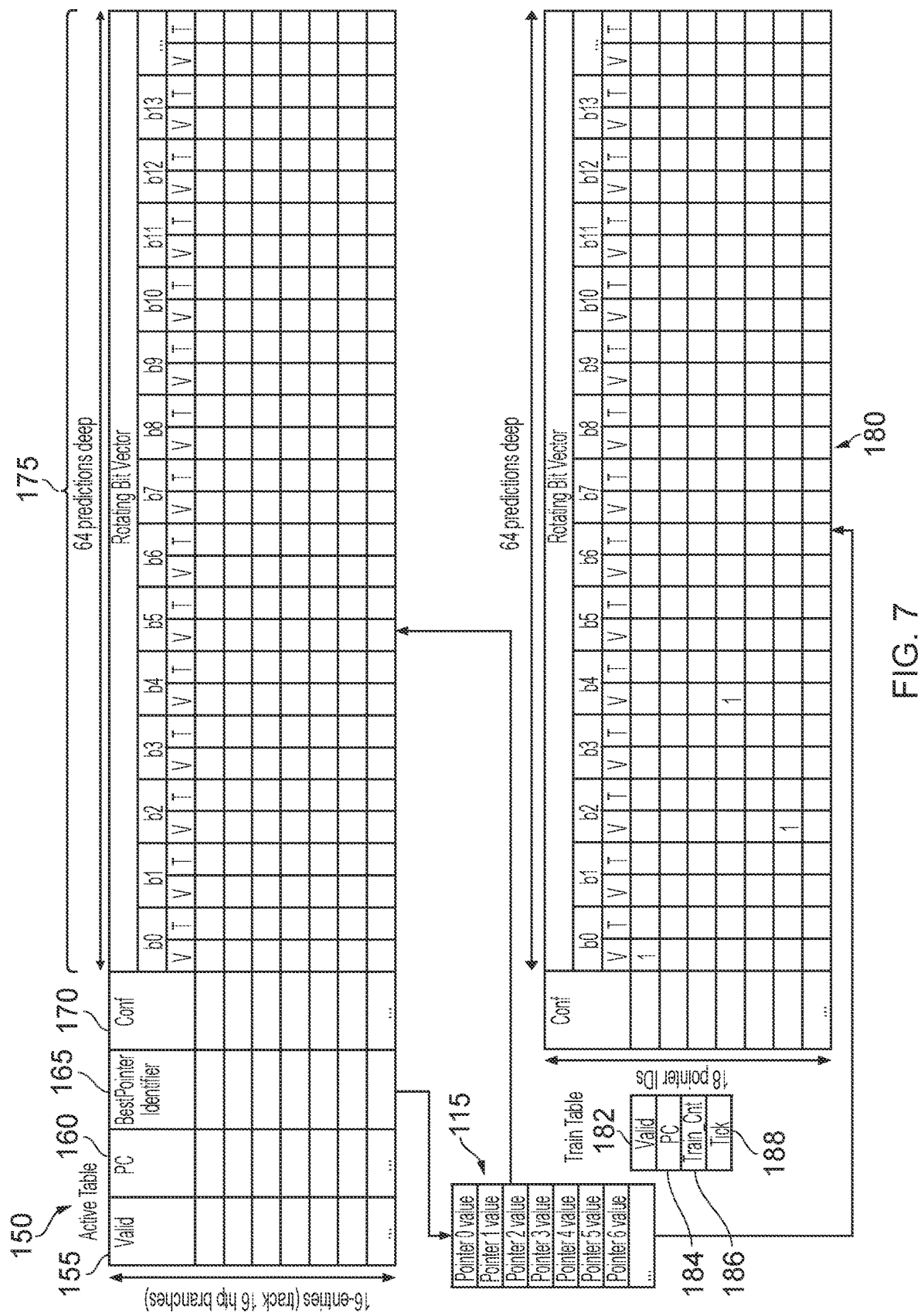
FIG. 7 schematically illustrates how training could be performed to determine pointers to associate with hard to predict (HTP) branch instructions being tracked.

One mechanism that could be used to seek to perform training within the apparatus of FIG. 6, in order to decide which pointer to use for any given control flow instruction being tracked within the history storage 105, is schematically illustrated in FIG. 7. In this example, a separate active table 150 and train table 180 is provided. The active table 150 includes a plurality of entries, where each entry is used for one HTP branch for which it is desired to make predictions. Each entry includes a valid field 155 to identify whether the entry is valid, a program counter field 160 to identify an address of the HTP branch instruction being tracked in that entry, a best pointer identifier field 165 to identify the pointer that is considered to be the best pointer for the HTP branch instruction being tracked, and a confidence indication 170 used to determine when there is sufficient confidence in the contents of the entry to enable predictions to be made using that entry. A rotating bit vector 175 is then maintained in each entry, in which to maintain the set of behaviours discussed earlier with reference to FIG. 6, populated using the pointer identified by the best pointer identifier field 165. As shown in FIG. 7, each entry in the bit vector is used to identify a taken or not taken prediction, and has a valid bit to identify whether a valid taken or not taken prediction has been stored in that entry.

The train table 180 enables, at any point in time, training to be performed for one hard to predict branch instruction being tracked in the active table. The valid field 182 is used to indicate when the contents of the train table are valid, the PC field 184 is used to identify the address of the HTP branch instruction being trained, and the train count field 186 is used to keep track of the number of training events that have taken place when training that HTP branch instruction. Separate entries in the train table are provided in order to maintain a rotating bit vector for each of the possible pointers stored in the pointer storage circuitry 115. In this particular example, it is assumed that there are 18 pointers, and hence 18 entries are provided. The rotating bit vectors take the same form as discussed earlier for the rotating bit vector 175 within the active table.

Whenever a resolved behaviour of the branch instruction for which training is being performed is received, an update process is performed for each of the entries of the train table 180 using, for each entry, the current value of the associated pointer, and if a bit vector entry pointed to by the pointer value is valid, and has a taken/not taken prediction that matches the resolved behaviour, then the confidence of that entry can be increased. Similarly, if the taken/not taken prediction does not match the resolved behaviour, then the confidence can be decreased. If there is not yet a valid bit vector entry, then that bit vector entry can be populated using the resolved behaviour. A similar update process can be performed within the active table 155 for each resolved behaviour received, and when the confidence indication indicated by the confidence indication field 170 reaches a threshold level, predictions can start to be made using the contents of the bit vector 175 for the entry containing the hard to predict branch in question.

Once a certain number of confidence updates (as indicated by the train count 186) have been made to an entry in the train table 180 for any of the pointers, then it can be determined whether the pointer having the highest confidence in the train table exceeds the confidence 170 of the current best pointer identified in the field 165 of the active table, and if so the best pointer identifier 165 and confidence indication 170 can be updated to identify the trained pointer having the highest confidence. At this point, the associated rotating bit vector 175 can also be updated to reflect the contents of the corresponding entry in the train table.

In the example illustrated in FIG. 7, a tick field 188 is provided, which can be used as a timeout in case a period of time elapses without any further training event been detected, so as to cause the current contents of the train table to be evaluated, the relevant entry in the active table to be updated if necessary, and then training to be performed for a different one of the hard to predict branch instructions being tracked in the active table.

Whilst this process can enable training to be performed for each of the hard to predict branch instructions being tracked, it suffers from a number of issues. Firstly, training can only be performed for one hard to predict branch at a time, and as a result the time taken to identify the best pointers to use for the various branch instructions being tracked can be unacceptably high. Also there are large periods of time where any given one of the branch instructions being tracked is not being trained, and hence the training may not be as accurate as desired. These problems are exacerbated if it is desired to increase the number of branch instructions being tracked.

Furthermore, in addition to the above disadvantages, if the size of the active table is increased to seek to track more hard to predict branches, then this leads to significant size/area requirements, due to the need for dedicated storage to store each of the rotating bit vectors for each of the entries.

Figure 8:
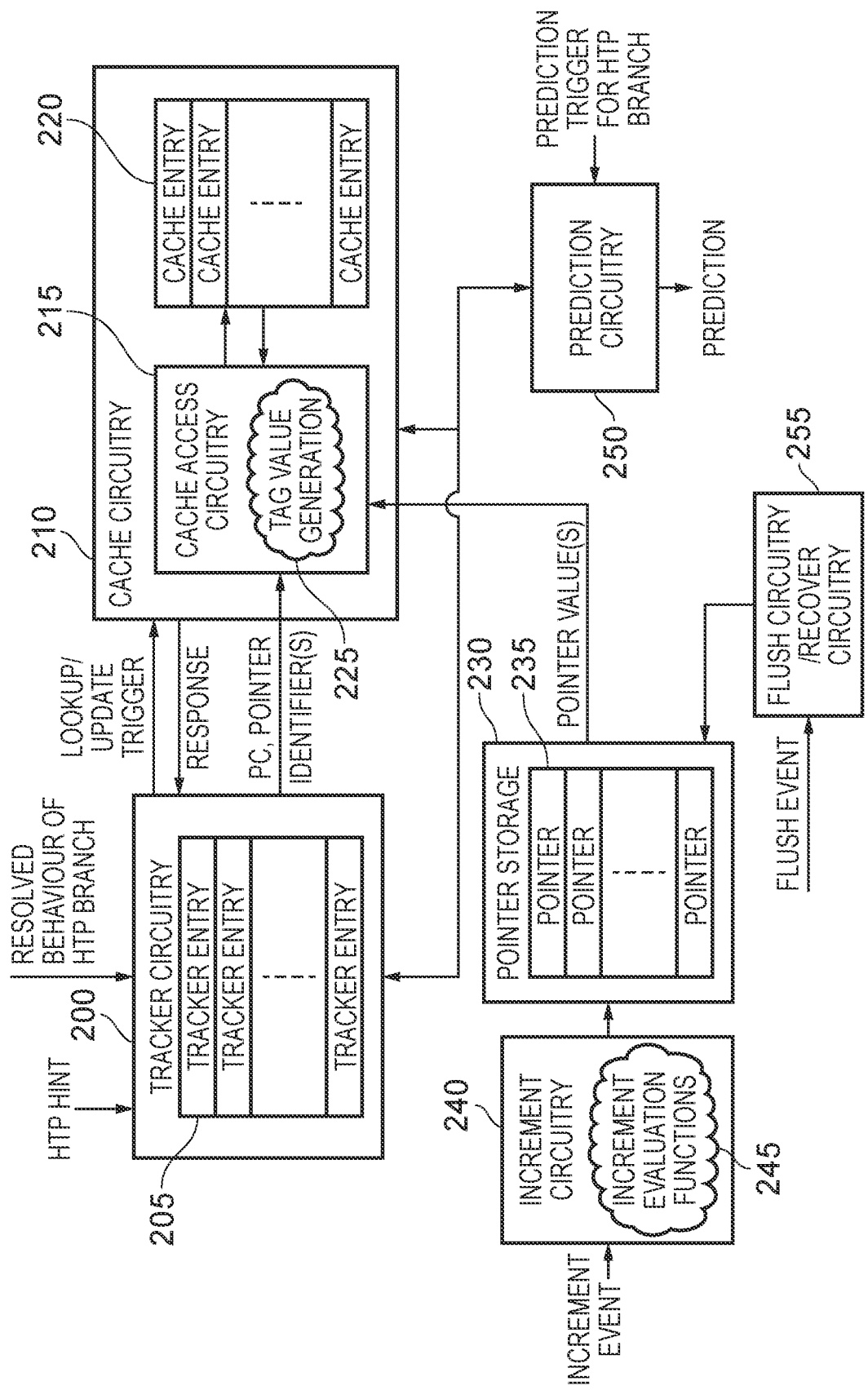
FIG. 8 schematically illustrates an example of a data processing apparatus in accordance with one example implementation.

In accordance with the techniques described herein, a mechanism is provided that seeks to alleviate the above issues, allowing a larger number of hard to predict branch instructions to be tracked in a cost/area efficient manner, and which improves the manner in which training is performed for the various hard to predict branches being tracked. An example of an apparatus in accordance with one example implementation is illustrated schematically in FIG. 8. As shown in FIG. 8, tracker circuitry 200 is provided that maintains a number of tracker entries 205. Each tracker entry can be used to identify an HTP branch instruction, a current active pointer to be associated with that instruction, and a current training pointer to be associated with that instruction. Confidence indications can also be maintained in the tracker entry for each of the active pointer and the training pointer. There are various ways in which it can be decided when to allocate any given branch instruction to an entry of the tracker circuitry 200, but in one example implementation a hard to predict hint may be provided to the tracker circuitry, for example to identify a branch instruction for which reliable prediction is not being achieved using a default prediction mechanism, for example the earlier discussed TAGE predictor.

Pointer storage 230 is provided that maintains a plurality of pointers 235, in much the same way as the earlier described pointer storage circuitry 115. However, instead of seeking to maintain bit vectors of resolved behaviours within the various tracker entries, cache circuitry 210 is provided that has a plurality of cache entries 220, where each cache entry is arranged to store a resolved behaviour of an instance of an HTP branch instruction being tracked by any of the tracker entries along with an associated tag value generated when the resolved behaviour was allocated into that cache entry. Cache access circuitry 215 is provided for maintaining the contents of the various cache entries 220, and for performing lookup operations within those cache entries as and when required. The cache access circuitry 215 includes tag value generation circuitry 225 that generates the associated tag values to be stored in association with resolved behaviours when those resolved behaviours are allocated into cache entries, and also to produce comparison tag values used when performing lookup operations.

Whenever a lookup operation needs to be performed (as for example may be the case when a resolved behaviour of an HTP branch instruction being tracked by the tracker circuitry 200 is observed, this resulting in the issuance of a lookup/update trigger to the cache circuitry 210 from the tracker circuitry 200), the cache access circuitry 215 will receive an identifier of the HTP branch instruction for which a lookup operation is required, in one example this being achieved by providing the program counter value of that HTP branch instruction from the tracker circuitry 200 to the cache access circuitry 215, and will also receive an identifier of the relevant pointer to be used when performing the lookup operation. This may be either the active pointer or the training pointer identified in the corresponding tracker entry, depending on the lookup required, and indeed in one example implementation it will typically be the case that two lookup operations will be performed, one using the active pointer and one using the training pointer. The tag value generation circuitry can then combine the received information, in combination with the pointer value of the relevant pointer as obtained from the pointer storage 230, in order to generate a tag value to be used during the lookup operation, as will be discussed in more detail later.

Depending on the outcome of such lookup operations, the contents of the various tracker entries may be updated, for instance to increment or decrement pointer confidence indications maintained for the active pointer and/or the training pointer. In addition, a training counter value may be maintained within each tracker entry, which can be incremented when a training event is determined to have occurred, in one example such a training event being determined to have occurred when either one or both of the active pointer confidence and the training pointer confidence for a given entry are updated. As will be discussed in more detail, when the training count has reached a threshold level, it can be determined whether the current training pointer is performing better than the current active pointer, and if so that training pointer can be identified as the new active pointer. Also at that point, a new training pointer can be chosen for the entry, and the training process reinitiated for that new training pointer.

By using a shared cache storage to maintain the resolved behaviours in, which is accessed in the way discussed above, this can significantly reduce the storage requirements for each individual HTP branch to be tracked, and hence can allow a significantly larger number of HTP branches to be tracked for any given area/cost provided for implementing such replay prediction. In one particular example implementation, the tracker circuitry may be arranged to maintain 256 tracker entries.

Increment circuitry 240 is provided that is responsive to increment events to apply a series of increment evaluation functions 245 to decide which pointers to increment in response to any given increment event. In one example implementation, the increment events take the form of detected backwards taken branches, such that each time a backwards taken branch is detected the increment circuitry 240 is arranged to perform the increment evaluation functions 245 in order to decide which pointers within the pointer storage 230 to increment. As discussed earlier, the evaluation functions can take a variety of different forms, but the aim is that over time the various pointers are incremented differentially with respect to each other. By way of specific example, and as noted earlier, a first pointer could have its value incremented for every backwards taken branch irrespective of the program counter value, a second pointer could be arranged never to be incremented irrespective of the program counter value, a third pointer could be incremented if a hash of all of the program counter bits is 1, a fourth pointer could be incremented if the hash of all the program counter bits is 0, etc.

When considering the above specific examples of pointers, it should be noted that the approach described in FIG. 8 where a shared cache structure is used, in addition to all the other benefits described herein, also provides a further efficiency benefit when compared with the approach shown in FIG. 7. In particular, the second pointer (i.e. the one that is never incremented irrespective of the program counter value) essentially corresponds to a last prediction direction tracker. However, the replay predictor would perform better if it used this pointer only when reusing the prediction for the same instance of a hard to predict branch from the wrong path to the new path, and not for subsequent instances of that hard to predict branch. Using the rotating buffer approach of FIG. 7, the last prediction is never cleared, so subsequent instances of that branch may use that prediction. However, when that prediction is allocated into the cache structure in the manner described herein, it will be evicted from that cache by predictions made by other branches and pointers. This ages out the prediction based on the second pointer, preventing it from being used on subsequent instances of the hard to predict branch.

Returning to FIG. 8, prediction circuitry 250 is provided that, in response to a prediction trigger in respect of a HTP branch instruction being tracked by the tracker circuitry 200, is arranged to reference the contents of the tracker circuitry 200 and the cache circuitry 210 in order to determine whether a prediction can be made of the behaviour (in this case the behaviour being whether the branch is predicted as taken or not taken) for the HTP branch instruction in question. In particular, if a lookup performed within the cache circuitry 210 using the program counter value of the HTP branch instruction, the currently active pointer and the value of that currently active pointer, results in a hit been detected, and the confidence in the currently active pointer has reached at least a threshold level, then the prediction circuitry may make a prediction using the behaviour stored in the hit entry of the cache.

As also shown in FIG. 8, flush circuitry/recover circuitry 255 can be provided to operate in much the same way as the circuitry 130 shown in FIG. 6, in response to a flush event. In one example implementation, such a flush event will occur when a misprediction is detected that causes the contents of the pipeline to be flushed and processing to resume from a previous position in the execution flow. As noted previously, the flush circuitry can be arranged to maintain the contents of the tracker circuitry and the cache circuitry during such a flush operation, and the recover circuitry can recover the relevant previous pointer values for the various pointers in response to the flush.

Figure 9:
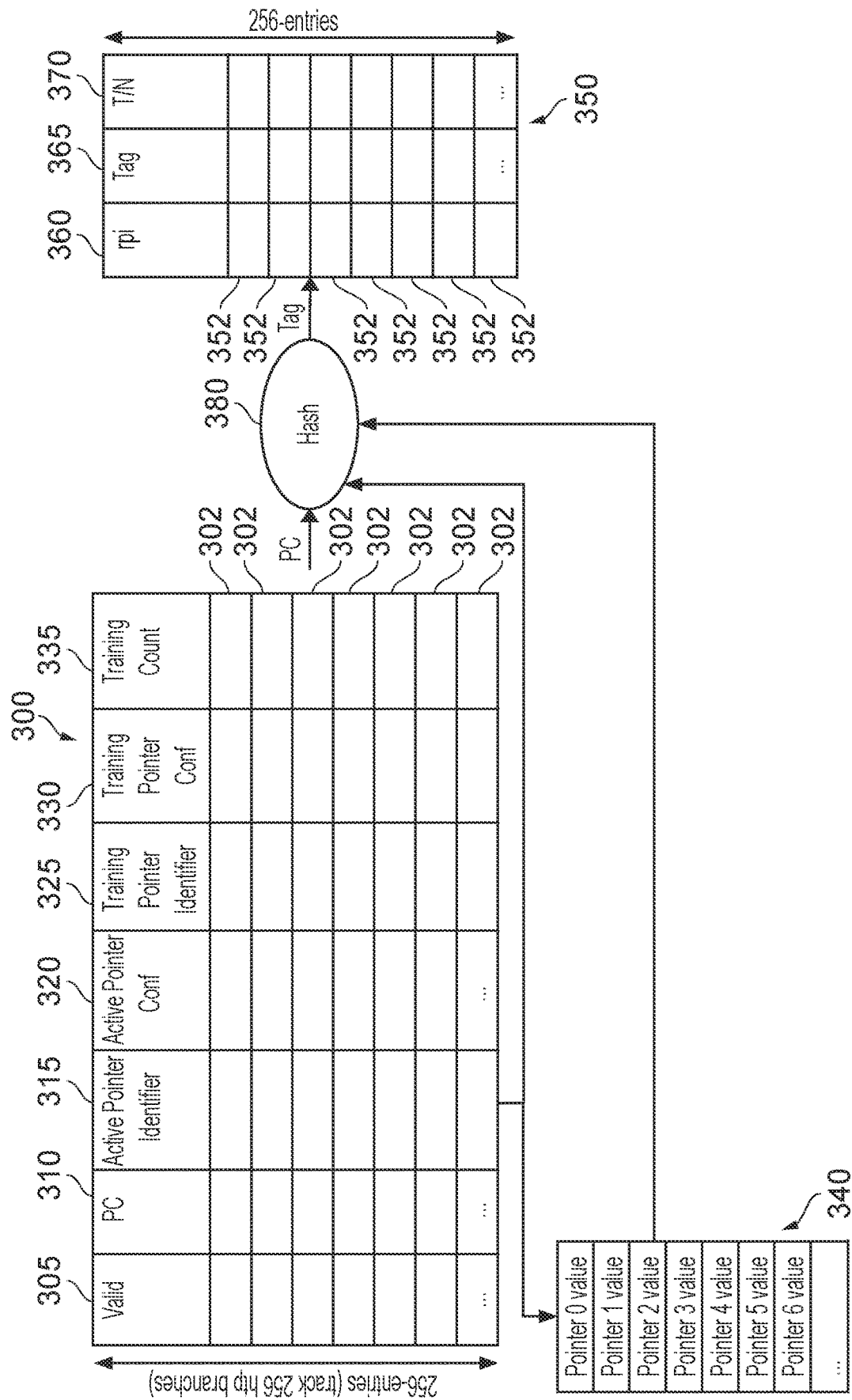
FIG. 9 illustrates how tag values may be generated in accordance with one example implementation when seeking to access the cache illustrated in FIG. 8.

FIG. 9 illustrates in more detail the contents of the tracker entries and cache entries, and the way in which tag values are generated, in accordance with one example implementation. In this example, the tracker circuitry contains tracker storage 300 providing a plurality of tracker entries 302. As shown, each tracker entry has a plurality of fields. A valid field 305 is used to identify whether the contents of the corresponding entry are valid, whilst the program counter field 310 is used to store the program counter value of the HTP branch instruction being tracked in that entry. An active pointer identifier 315 identifies one of the plurality of pointers in the pointer storage that is currently viewed to be the active pointer for the entry in question, and the associated active pointer confidence field 320 identifies a confidence indication for that active pointer. Similarly, the field 325 identifies a training pointer, again this being chosen from amongst the pointers maintained in the pointer storage 230, whilst the associated training pointer confidence field 330 provides a confidence indication for the training pointer. The training count field 335 is used to maintain a count of training events that have occurred in respect of the corresponding entry, so that when a certain threshold is reached an evaluation can be performed to determine whether the training pointer is performing better than the active pointer.

As shown in FIG. 9, the cache circuitry 210 may maintain a cache storage 350 containing a plurality of cache entries

352. Each cache entry can be used to store a tag value 365 generated by the tag value generation circuitry 225 when that cache entry was populated, and can also store an associated resolved behaviour in the field 370, in this case the taken/not taken behaviour. As also shown in FIG. 9, if desired, a field 360 can be used to store replacement policy information (rpi) referenced by the cache circuitry when selecting a victim cache entry whose current contents are to be overwritten to make space for allocation of new content.

The tag value generation circuitry 225 can take a variety of forms, but in the example of FIG. 9 implements a hash function 380 using as inputs the program counter value of the HTP branch instruction in question, the active pointer identifier associated with that HTP branch instruction in the relevant tracker entry, and the current pointer value of that active pointer as obtained from the pointer storage 340 (this corresponding to the pointer storage 230 shown in FIG. 8). By performing a hash operation using these three pieces of information, it will be appreciated that the tag value generated will be dependent on the current active pointer, and the value of that active pointer at the time the tag value is generated.

The cache storage 350 can be organised in a variety of ways, and hence for example could take the form of a fully associative cache or a set associative cache. In one particular example implementation it is assumed that the cache storage is a fully associative cache, and accordingly all entries are referenced when performing a lookup operation, as any given content can be allocated in any available entry within the cache.

Figure 10:
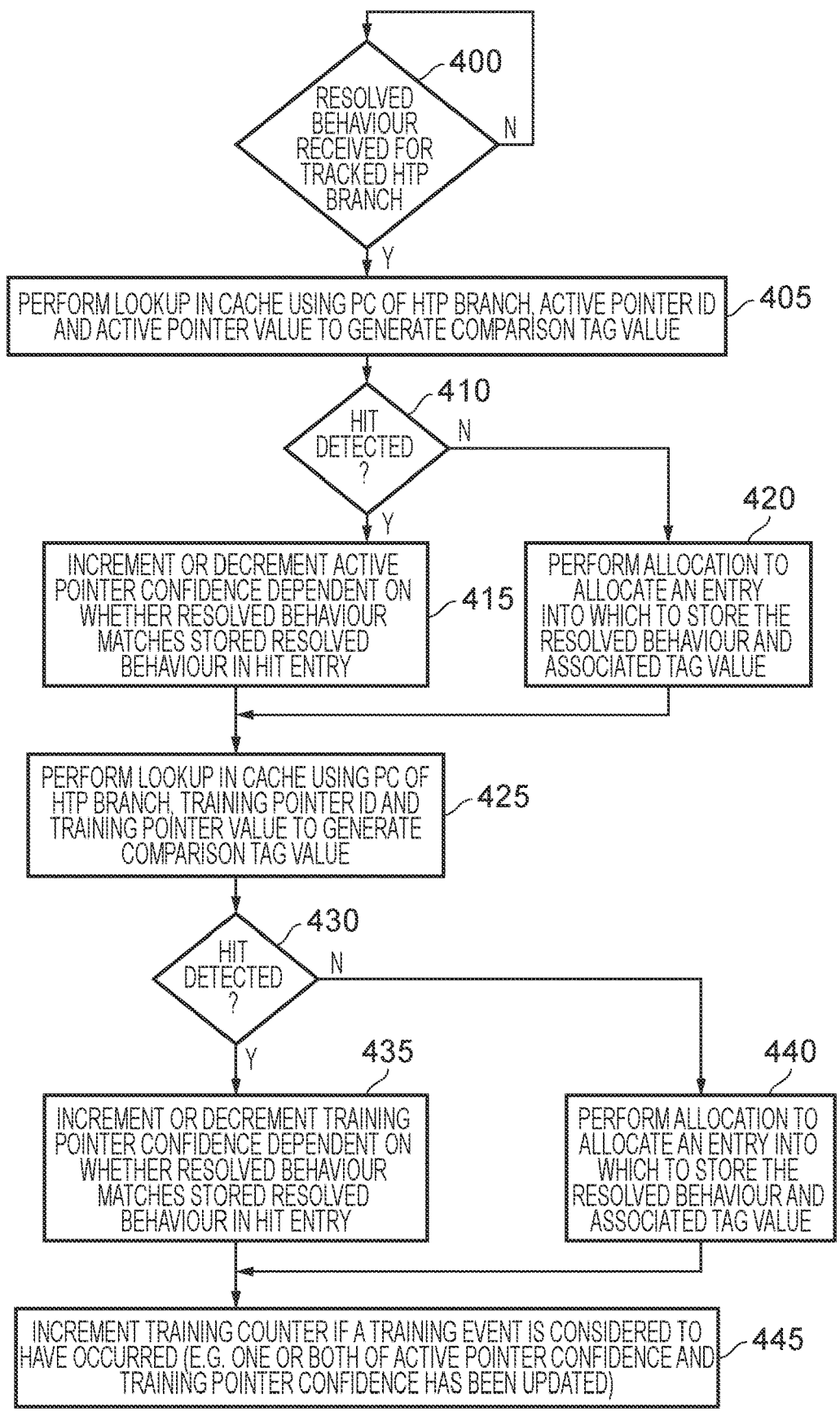
FIG. 10 is a flow diagram illustrating steps performed by the apparatus of FIG. 8 upon receiving an indication of resolved behaviour for a tracked HTP branch instruction, in accordance with one example implementation.

FIG. 10 is a flow diagram illustrating steps performed by the apparatus of FIG. 8 when a resolved behaviour is received for an HTP branch instruction being tracked within the tracker circuitry 200. When such a resolved behaviour is detected at step 400, then at step 405 a lookup is performed in the cache of the cache circuitry 210 using a comparison tag value that is generated using the program counter value of the HTP branch instruction in question, the active pointer identifier for that HTP branch as identified by the tracker entry, and the pointer value of that active pointer.

It is then determined at step 410 whether a hit has been detected in one of the cache entries (i.e. whether the comparison tag value matches the stored tag value in that entry), and if so the process proceeds to step 415 where the active pointer confidence in the relevant tracker entry may be incremented or decremented dependent on whether the resolved behaviour matches the stored resolved behaviour in the hit entry. For example, in one particular implementation the active pointer confidence is incremented if the resolved behaviour matches the stored resolved behaviour, and is otherwise decremented. However, if desired, this increment/decrement functionality can be made dependent on other criteria. For example, it may be determined in one example implementation to inhibit update of the confidence indication if the predicted behaviour stored in the hit entry matches the prediction that would have been made using a default prediction mechanism, such as the earlier described TAGE predictor.

If a hit is not detected at step 410, then in one example implementation an allocation is performed within the cache, in order to allocate an entry into which to store the resolved behaviour and the associated tag value. The earlier discussed replacement policy information can be referenced by the cache circuitry when determining a victim entry into which to allocate this new information. In one example implementation, when performing such an allocation, no update is made to the active confidence indication being maintained in the relevant tracker entry.

As also shown in FIG. 10, in addition to performing a lookup using the active pointer, a lookup is also performed using the training pointer. Hence, at step 425, a comparison tag value is generated using the program counter of the HTP branch instruction, the training pointer identifier stored in the relevant tracker entry, and the current pointer value of that training pointer, and a lookup is performed in the cache using that comparison tag value. At step 430 it is determined whether a hit has been detected, and if so then at step 435 the training pointer confidence may be incremented or decremented dependent on whether the resolved behaviour matches the stored resolved behaviour in the hit entry, in much the same way as the active pointer confidence is incremented or decremented as discussed earlier with reference to step 415.

Again, this functionality can be inhibited in certain situations if desired, for example if the predicted behaviour stored in the hit entry matches the prediction that would be made by a default prediction mechanism. Further, in one example implementation, if only one of the two lookup operations performed at steps 405 and 425 results in the associated confidence indication needing to be incremented, and that associated confidence indication is already at a saturated level, then instead the other confidence indication can be decremented (so by way of specific example, if it was determined that the active pointer confidence needed incrementing but the training pointer confidence did not, and the active pointer confidence was already at a saturated level, it may be determined instead to decrement the training pointer confidence).

If a miss is detected at step 430, then at step 440 an entry can be allocated into which to store the resolved behaviour and the associated tag value, in much the same way as an allocation may be performed as discussed earlier at step 420 when performing the lookup using the active pointer.

Irrespective of which of steps 435 or 440 are performed, at step 445 the training counter is incremented if a training event is considered to have occurred. In one example implementation, such a training event will be considered to have occurred if one or both of the active pointer confidence and the training pointer confidence has been updated as a result of the process described with reference to FIG. 10.

Figure 11:
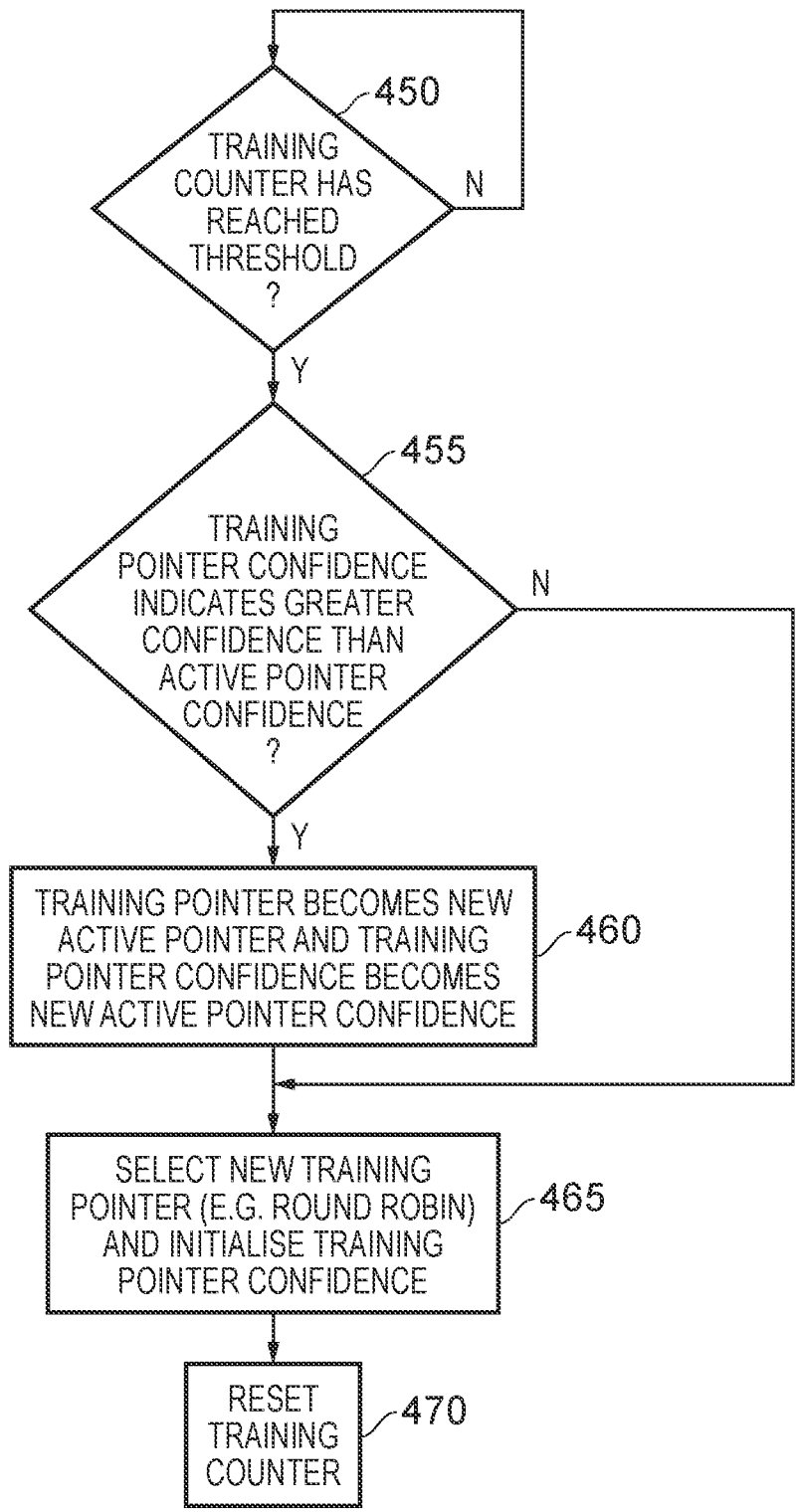
FIG. 11 is a flow diagram illustrating steps performed by the apparatus of FIG. 8 upon determining that a training counter has reached a determined threshold, in accordance with one example implementation.

FIG. 11 is a flow diagram illustrating steps taken in one example implementation when the training counter of a given tracker entry has reached a threshold level. Any suitable threshold level can be chosen, but in one particular example implementation the threshold level is determined to have been reached when 32 training events have been detected. When this is detected at step 450, it is then determined at step 455 whether the training pointer confidence indicates a greater confidence than the active pointer confidence, for the tracker entry in question. If so, then the training pointer becomes the new active pointer at step 460, and similarly the training pointer confidence becomes the new active pointer confidence. Thereafter, at step 465, or directly following step 455 if it is determined that the training pointer confidence is not greater than the active pointer confidence, a new training pointer is selected and the training pointer confidence is initialised for that newly selected training pointer. There are various ways in which the new training pointer can be selected, but the aim is to cycle through all of the possible pointers over time in order to decide which one performs best for any given HTP branch instruction being tracked, and hence in one example implementation the new training pointer can be selected in a round robin manner, by cycling through the pointers maintained within the pointer storage 340. At step 470, the training counter is then reset, so as to reinitiate the above described training process.

It should be noted that by adopting the above described approach, each of the tracker entries is trained at its own rate, depending on the frequency at which the HTP branch instruction being tracked in that tracker entry is encountered, and hence allows training to be performed more quickly for the more commonly appearing HTP branch instructions. This can significantly improve performance, since the more frequently appearing HTP branch instructions are the ones that will give rise to the best incremental performance improvement if they are predicted correctly.

Figure 12:
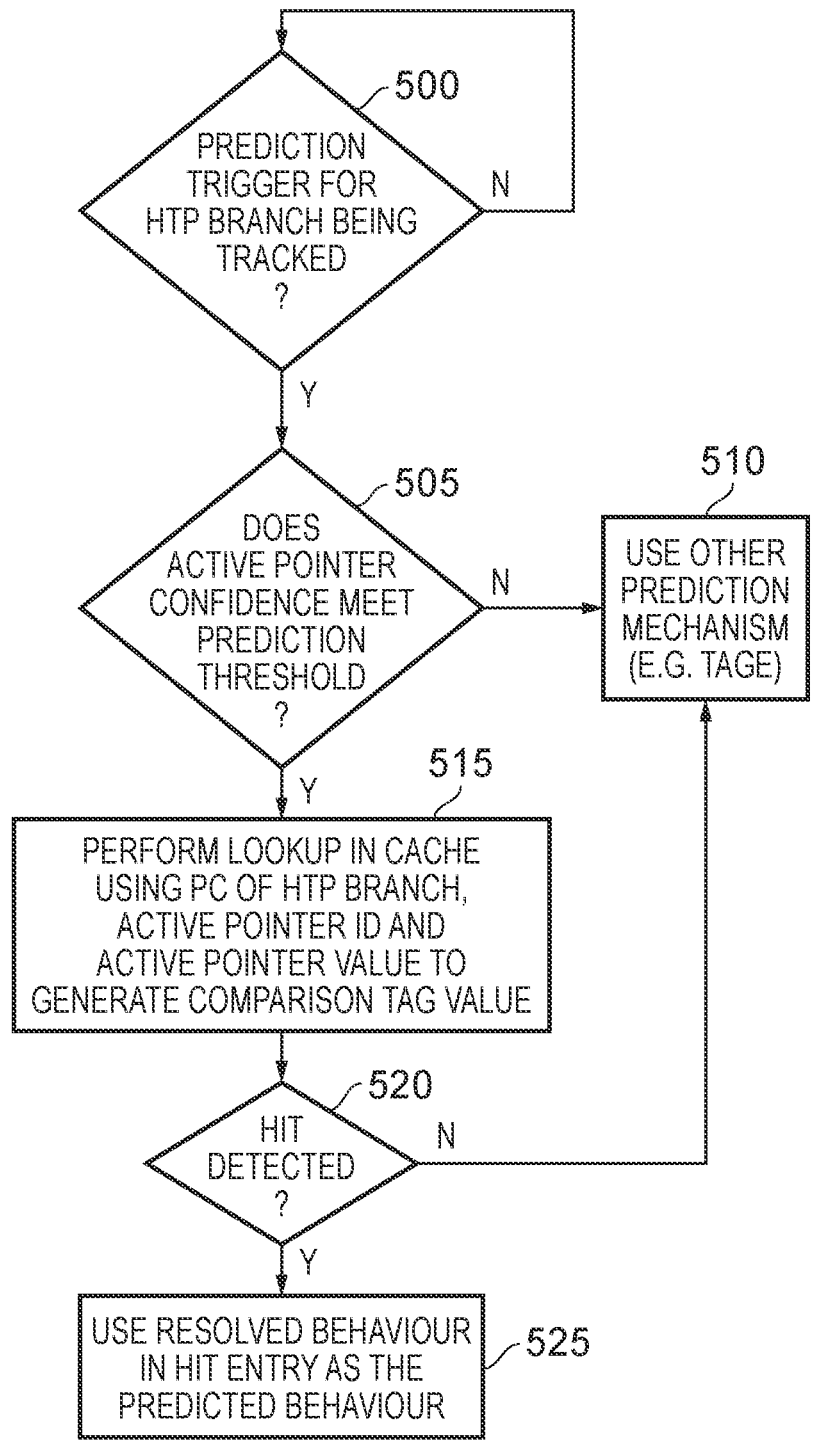
FIG. 12 is a flow diagram illustrating steps performed by the apparatus of FIG. 8 upon receipt of a prediction trigger for a tracked HTP branch instruction, in accordance with one example implementation.

FIG. 12 is a flow diagram illustrating steps taken by the apparatus of FIG. 8 upon receipt of a prediction trigger for a HTP branch instruction being tracked within the tracker circuitry. When such a prediction trigger is received (for example due to a tracked HTP branch instruction being detected in the instruction flow), it is determined at step 505 whether the active pointer confidence indicated in the relevant tracker entry meets a determined prediction threshold, and if not then at step 510 a different prediction mechanism is used to make the prediction, for example the earlier discussed TAGE predictor.

However, if the active pointer confidence does meet a specified prediction threshold, then at step 515 a lookup is performed in the cache using a comparison tag value generated using the program counter of the HTP branch instruction in question, the active pointer identifier as identified by the relevant tracker entry, and the current value of the active pointer. It is then determined at step 520 whether a hit has been detected, and if not then the process proceeds to step 510 where another prediction mechanism is used as discussed earlier. However, if a hit is detected, then the resolved behaviour as stored in the hit entry is used as the predicted behaviour at step 525.

It has been found that the above described techniques can provide for significantly improved prediction performance for a variety of HTP branch instructions than would be achieved by using other prediction mechanisms. However, it may still be the case that there are certain HTP branch instructions for which it is difficult to obtain accurate predictions. For example, some HTP branch instructions may be provided within a software function that is called from multiple different places within program code, and the behaviour of that HTP branch instruction may depend upon where that function is called from within the program code. As a result, the correlation that is seeking to be determined using the above described technique may be difficult to realise due to the behaviour of that HTP branch instruction varying in such a way.

Figure 13:
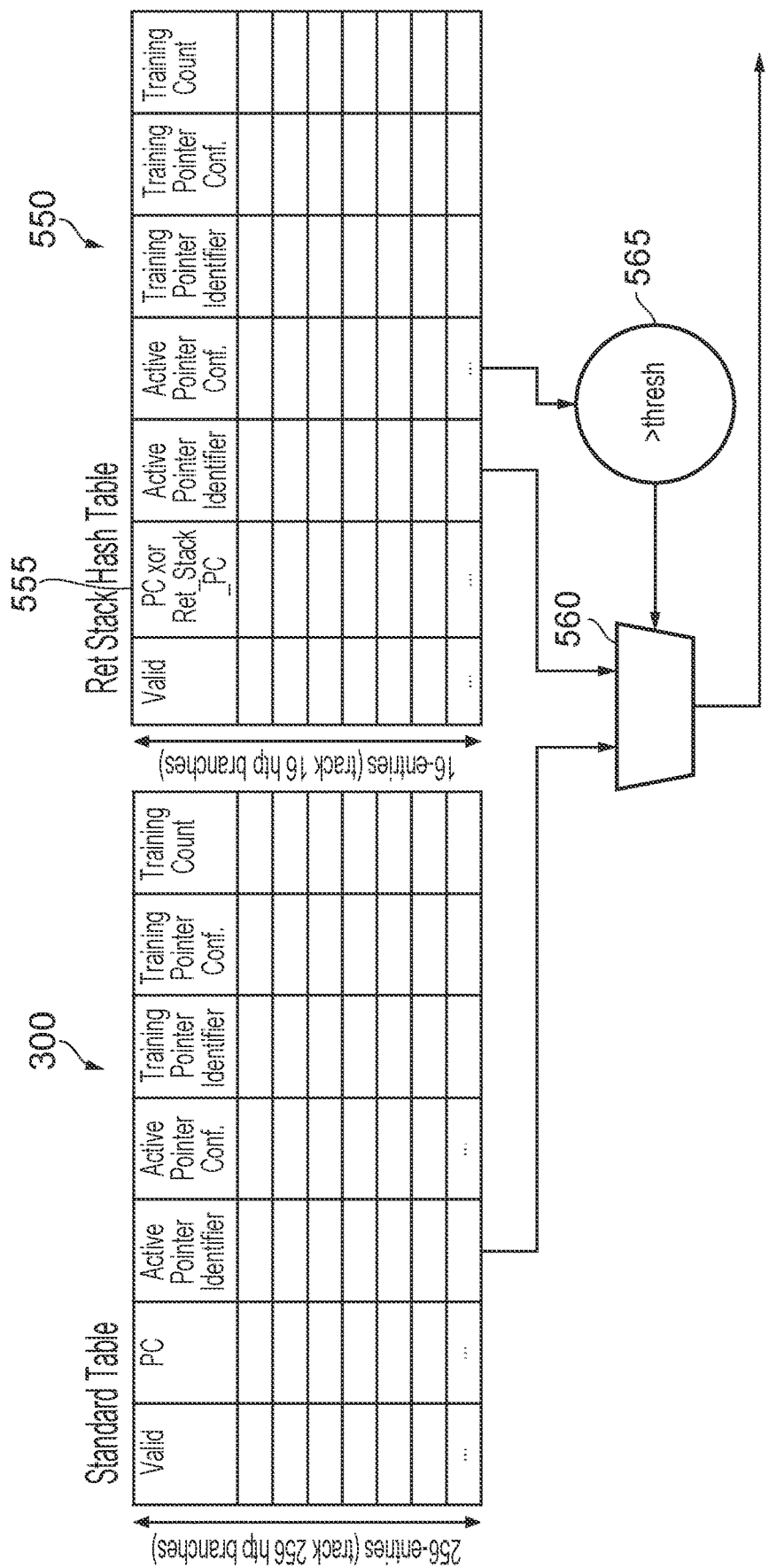
FIG. 13 is a diagram schematically illustrating the use of an additional tracker table for hard to predict branch instructions, in accordance with one example implementation.

In order to seek to improve the prediction accuracy for such HTP branch instructions, then in one example implementation the tracker circuitry may be arranged to maintain a plurality of additional tracker entries, as illustrated schematically in FIG. 13. As shown, in addition to the standard tracker table 300, which may take the form discussed earlier with reference to FIG. 9, an additional table 550 may be provided, referred to in FIG. 13 as a return stack hash table. As will be seen, the return stack hash table 550 contains a number of entries that essentially have the same fields as the entries in the standard table. However, instead of merely storing the program counter of the HTP branch instruction being tracked, as can be seen by the field 555 of an entry in the return stack hash table 550, that program counter value is XORed with a return stack program counter value identifying where within the program code execution will return to once the function containing the HTP branch instruction in question has completed. Hence, the address indication captured within the field 555 is influenced by where within the program code the function containing the HTP branch instruction in question was called from.

The entries in the return stack hash table 550 can be used and trained in much the same way as the entries in the standard table 300, with both of these tracker tables making use of the cache storage maintained by the cache circuitry 210. The only difference is that when the tag value generation circuitry performs the tag generation process, it will use the contents of the field 555 as the address indication, and as noted above those contents are formed by combining the program counter of the HTP branch instruction in question with a return stack program counter value.

How many entries are provided within the return stack hash table 550 is a matter of design choice, but in one example implementation it may be the case that there are significantly fewer entries in the return stack hash table 550 than in the standard table 300. In the particular example illustrated in FIG. 13, there are 256 entries in the standard table 300, but only 16 entries in the return stack hash table 550. In this example implementation, it is assumed that an entry is only made within the return stack hash table 550 if a threshold level of prediction accuracy is not being achieved using the corresponding entry in the standard table 300.

When an entry is made in the return stack hash table 550, then in one example implementation the corresponding entry in the standard table may be invalidated. However, in an alternative implementation, both entries may be maintained, so that either can be used for prediction dependent on prediction accuracy achieved. In the particular example shown in FIG. 13, a threshold detection circuitry 565 may be used to determine when the active pointer confidence of the corresponding entry in the return stack hash table 550 reaches or exceeds a threshold level, at which point the prediction circuitry may switch (as indicated schematically by the multiplexer 560) from using the contents of the relevant tracker entry in the standard table when performing a lookup within the cache to obtain the predicted behaviour, and instead may use the contents of the corresponding entry in the return stack hash table to perform such lookup operations in order to obtain the predicted behaviour.

Figure 14:
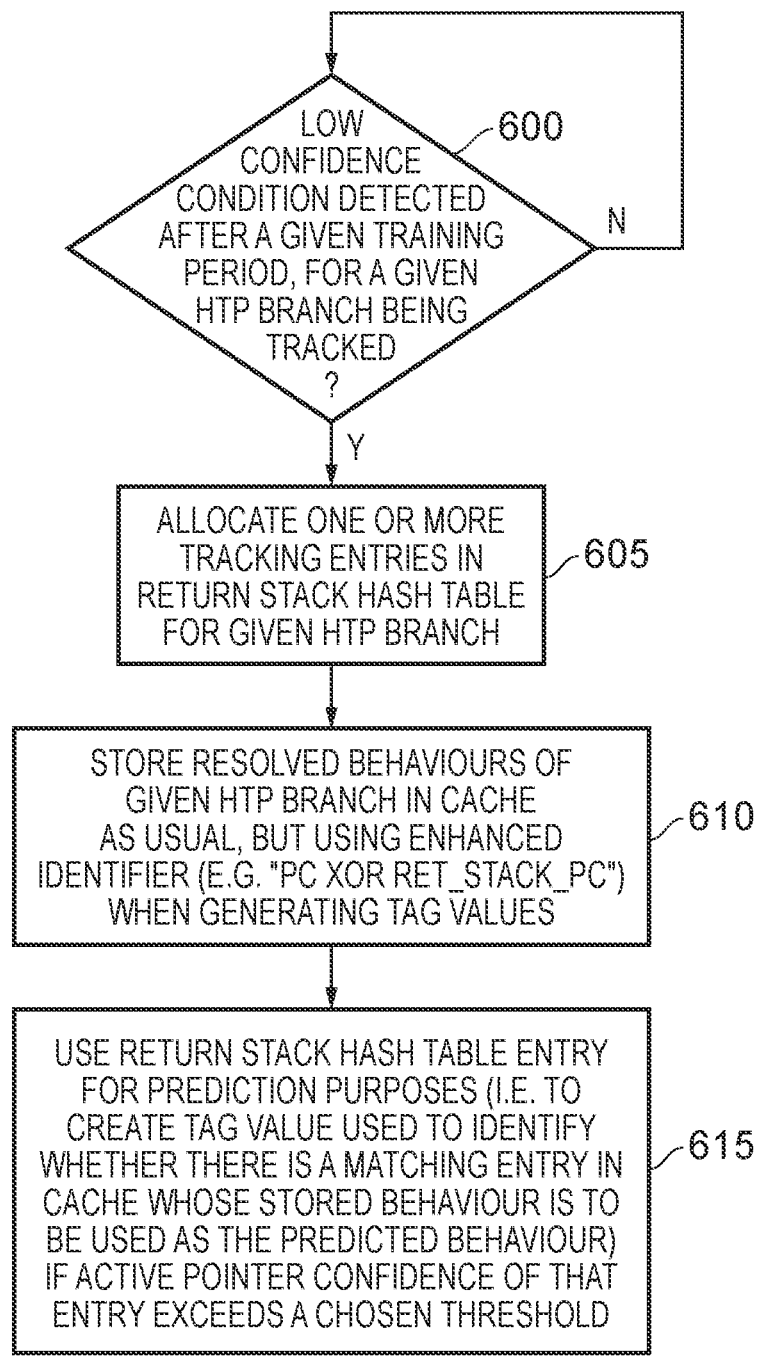
FIG. 14 is a flow diagram illustrating how the additional tracker table of FIG. 13 may be utilised, in accordance with one example implementation.

FIG. 14 is a flow diagram illustrating one way in which the technique illustrated in FIG. 13 may be used. At step 600, it is determined whether a low confidence condition has been detected after a given training period, for a given HTP branch instruction being tracked by a tracker entry in the standard table 300. That training period can be chosen as desired, but by way of example may involve at least one training iteration through all of the pointers, with the best performing of those pointers then being reflected as the current active pointer in the tracker entry of the standard table. If after that process a certain level of mispredictions still occurs when predicting the behaviour of the given HTP branch instruction, this may be treated as elapse of the above-mentioned training period and cause an additional tracker entry to be allocated for that given HTP branch instruction within the return stack hash table 550, with the training process then being performed for that additional tracker entry.

Hence, as shown in FIG. 14, if such a low confidence condition is detected after a given training period, then at step 605 one or more tracking entries are allocated in the return stack hash table for the given HTP branch instruction, and thereafter, at step 610, resolved behaviours of the given HTP branch instruction are stored in the cache as usual, but using the enhanced address identifier referred to earlier when generating tag values, which in one example implementation is achieved by XORing the program counter of the hard to predict branch instruction with the program counter value on a return stack. If the corresponding tracker entry in the standard table is still being used in parallel, then the resolved behaviours can also cause updates to be made using the contents of the entry in the standard table, as discussed earlier.

At step 615, the return stack hash table entry can be used for prediction purposes if the active pointer confidence of that entry exceeds a chosen threshold. This can be achieved by creating a tag value using the contents of the field 555 of the relevant entry in the return stack hash table, in combination with the active pointer identifier and the current value of the active pointer, in order to create a comparison tag value used to determine whether there is a matching entry in the cache, and if so the stored behaviour in that matching entry can be used as the predicted behaviour.

Figure 15:
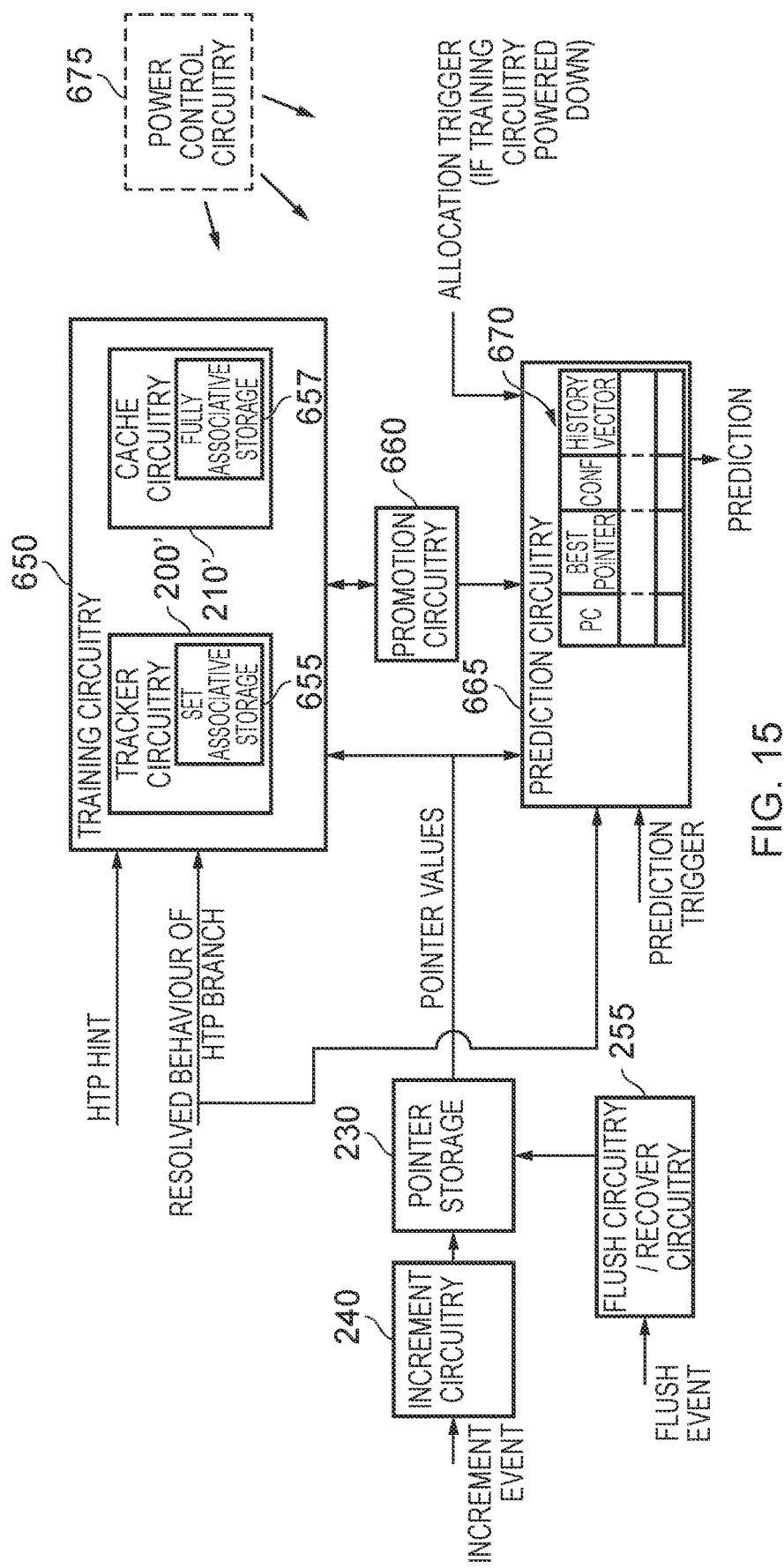
FIG. 15 schematically illustrates an example of a data processing apparatus in accordance with one example implementation.

FIG. 15 is a block diagram schematically illustrating such an implementation, and in this figure components that are common to the example shown earlier in FIG. 8 are designated with the same reference numerals. As shown, training circuitry 650 is provided, which incorporates both tracker circuitry 200' and 210' which generally take the form discussed earlier when describing the tracker circuitry 200 and cache circuitry 210 of FIG. 8. However, since the training circuitry 650 does not need to meet the performance requirements that the tracker circuitry 200 and cache circuitry 210 would be required to meet in order to seek to improve prediction bandwidth, the topologies of the storage components provided by the tracker circuitry 200' and cache circuitry 210' can be chosen so as to seek to be more power and area efficient. By way of example, the tracker circuitry no longer needs to use a fully associative or very highly associative structure, but instead can use a more standard set associative storage structure such as a two-way set associative storage structure. This can significantly reduce the area and power consumption requirements, which can for example allow the tracker circuitry to be implemented in random access memory. Further, there is more flexibility in the topology used for the cache circuitry 210'. In one example implementation a fully associative storage structure is still used to implement the storage in the cache circuitry, but the size of that storage can be reduced, as will be discussed in more detail later.

As shown in FIG. 15, promotion circuitry 660 is provided that can be used to allocate a given hard to predict branch instruction being tracked by the training circuitry 650 into a prediction entry of table 670 of the prediction circuitry 665 when the training circuitry 650 has identified a suitable associated pointer for that given hard to predict branch instruction (i.e. an associated pointer whose pointer value increments in a manner that meets a correlation threshold with occurrences of instances of that hard to predict branch instruction). The prediction entries of table 670 can be organised in much the same way as the entries of the active table 150 described earlier with reference to FIG. 7. Hence, each prediction entry may include a program counter field to identify an address of the HTP branch instruction being tracked in that entry, a best pointer identifier field to identify the pointer that is considered to be the best pointer for the HTP branch instruction being tracked (which will be specified by the promotion circuitry 660 at the time the allocation takes place, based on the associated pointer that the training circuitry has identified), and a confidence indication used to determine when there is sufficient confidence in the contents of the prediction entry to enable predictions to be made using that entry. That confidence indication may be initialised to a given value, for example the value of the associated pointer confidence indication maintained in the relevant tracker entry for the hard to predict branch instruction now being allocated into the prediction circuitry. A history vector field may also be provided which can be used to store a rotating bit vector such as a rotating bit vector of the form 175 described earlier when discussing FIG. 7. Hence each entry in the bit vector may be used to identify a taken or not taken prediction, and may have a valid bit to identify whether a valid taken or not taken prediction has been stored in that entry.

There are various ways in which the history vector may be populated in response to a prediction entry being allocated for a given control flow instruction. For instance, in one implementation the history vector may be populated at the time the prediction entry is allocated, for example by retrieving from the cache circuitry 210' the resolved behaviour for one or more instances of the given control flow instruction. Alternatively, the history vector may instead be populated after the prediction entry has been allocated, using the resolved behaviour for one or more subsequently observed instances of the given control flow instruction, which can be forwarded to the prediction circuitry 665 in addition to being forwarded to the training circuitry 650. As a yet further example approach, a hybrid approach could be taken, where the history vector could be at least partly populated using information retrieved from the cache circuitry 210', but could then be supplemented in response to each subsequently observed instance of the given control flow instruction.

The pointer storage 230, increment circuitry 240 and flush circuitry/recover circuitry 255 can operate in the same way as described when discussing those components in relation to the example implementation of FIG. 8. The pointer values retrieved from the pointer storage 230 can be provided to the training circuitry 650 and/or the prediction circuitry 665, as required.

In response to a prediction trigger received by the prediction circuitry 665, then it can be determined whether a valid prediction entry exists for the hard to predict branch instruction associated with the prediction trigger, and if so it can be determined whether the confidence indication in that prediction entry meets a certain prediction threshold. If it does, then an element within the history vector can be identified based on the best pointer indicated for that hard to predict branch instruction within the prediction entry, and the current pointer value of that pointer as retrieved from the pointer storage 230, and if that element is valid then the resolved behaviour stored in that element can be used as the predicted behaviour output by the prediction circuitry 665.

In an optional implementation power control circuitry 675 may be provided to allow the apparatus shown in FIG. 15 to be operated in various different power modes. In one possible power mode it may be the case that the training circuitry 650 is turned off. In that case, an allocation trigger may be used to directly allocate entries into the prediction circuitry 665 in the event of a misprediction threshold being reached for a given hard to predict branch instruction (for example if a reliable prediction for that hard to predict branch instruction has proven not to be possible using other prediction mechanisms such as the earlier described TAGE prediction mechanism).

Regardless of whether training data is stored for each HTP branch, it will be appreciated that the above techniques still involve the storing of a large amount of data. In particular, it is necessary to store sufficient data so that a rewind can occur. History of the loop counters must be kept so that they can be set to a previous value that they held at a previous point in the program in the case of a rewind. For instance, imagine that compression is used so that 18 pointer values are stored as a series of checkpoints together with a number of deltas made at each instruction. Each delta occupies 18 bits to indicate whether the pointer value was incremented. Each checkpoint occupies 8 bits per pointer value (of which there are 18) for a total of 144 bits per checkpoint. If 32 checkpoints are stored and a delta is provided every four instructions (thereby allowing a rewind of up to 128 instructions), then this would require over 6000 bits to implement. Note that this storage is in addition to storage of the outcomes of the branch instructions themselves.

The present technique recognises that it is not necessary to maintain all of the pointer values simultaneously.

FIG. 16 illustrates a set of pointer update conditions (18 in total). For each of the pointer values 120; 235, the behaviour (e.g. outcome) of control flow instructions (e.g. backwards taken branches) will be stored and the pointer advanced if the requirements associated with that pointer are met. For instance, when a backwards taken branch instruction is encountered, the outcome will be stored in the set of behaviours 110; associated with pointer 2 (and pointer 2 will be incremented) if the program counter value is not a multiple of 4. That is every fourth instruction will be filtered out. Similarly in the case of pointer 3, every fourth instruction (with an offset of 1) will be filtered out. Pointers 6 to 9 (inclusive) are used to perform the reverse. That is, in the case of pointer 6, every instruction except the fourth instruction will be filtered out. In the case of pointer 7, every instruction except the fourth instruction (with an offset of 1) will be filtered out. Pointer 16 causes every other instruction to be filtered out and pointer 17 is the reverse of that (every other instruction is unfiltered).

In this example, pointers 0 and 1 are special cases. Pointer 0 is the complete absence of filtering so that every backwards taken branch behaviour is stored. Pointer 1 is complete filtering where every backwards taken branch is filtered out.

At some point a misprediction is likely to occur. This causes the program execution to 'rewind'. As part of this rewind process, the pointer values 120; 235 will be rewound to values that they held at a previous point in time.

Figure 17:
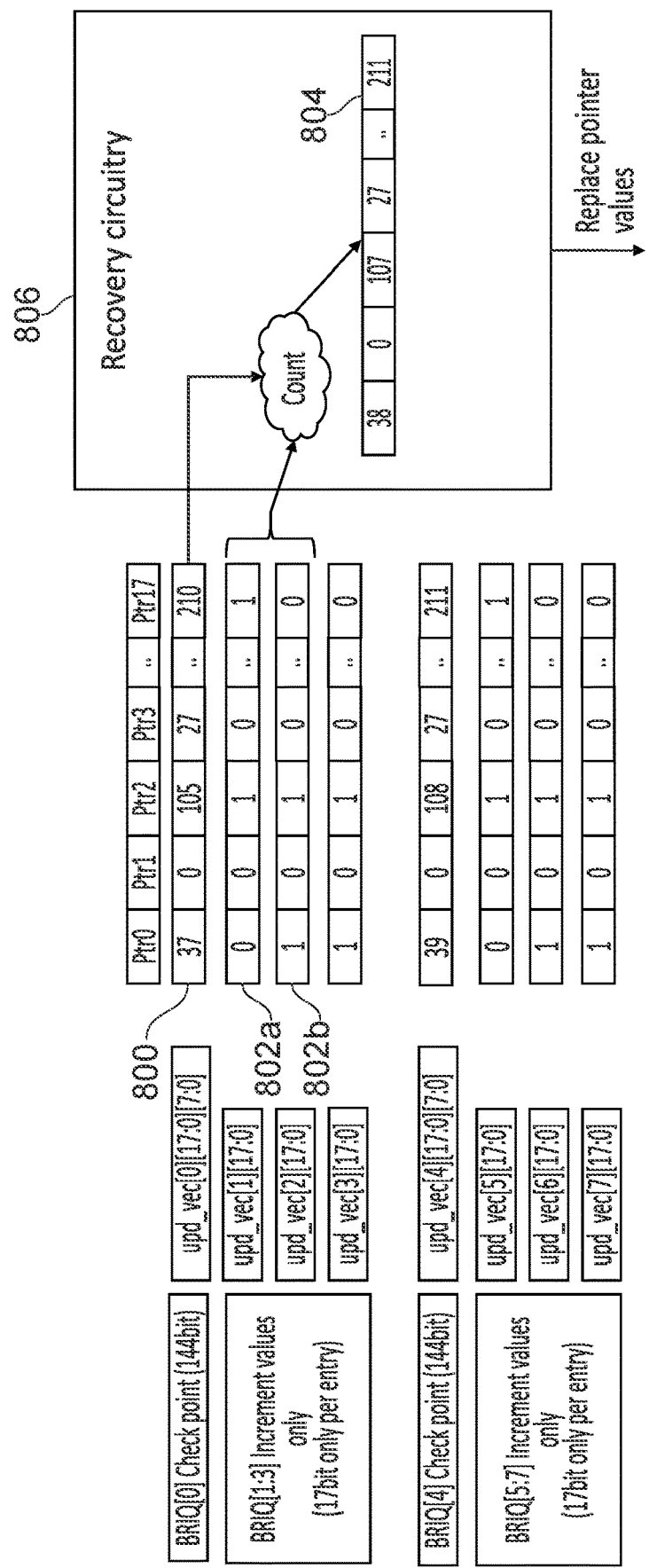
FIG. 17 illustrates one way of storing historic data regarding the pointer values so that a rewind can be performed.

FIG. 17 illustrates one way of storing historic data regarding the pointer values so that a rewind can be performed. In the example of FIG. 17, a series of checkpoints of the pointer values are stored, with intermediate deltas being stored between the checkpoints. The checkpoints show the full pointer values at a given point in time, while the deltas show the changes are that made subsequent to the checkpoint (e.g. at each instruction). In this example, there are 18 pointers and these are represented by 8-bit values. Each checkpoint therefore requires 18×8=144 bits. Each checkpoint can be represented by an 18-bit bit vector showing which pointer values were incremented. Each checkpoint therefore uses 18 bits. In this situation, the recovery can work as follows: When a rewind is to occur to a previous instruction, the nearest checkpoint older than the previous instruction is sought by recovery circuitry 806 (which is an example of the previously described recovery circuitry 46). The deltas between the nearest older checkpoint and the previous instruction are then applied (e.g. added together) and the result is the value of the pointers at the time of that previous instruction. The recovery circuitry 806 can then replace the set of pointer values 120; 235 with the reconstructed values. For instance, as shown in FIG. 17, a rewind occurs to a particular previous instruction. It is determined that the checkpoint 800 is the checkpoint that is both older than the particular previous instruction and previous to it. That is, the following checkpoint would represent the state of the pointer values after the instruction to which the rewind is taking place, and the preceding checkpoint would be older than the current checkpoint (and both are older than the instruction to which the rewind is occurring). In this example, it is assumed that the instruction to which the rewind is taking place is two instructions on from the selected checkpoint. Thus, the following two deltas 802a, 802b are added together and applied and this results in a reconstructed set of pointer values 804. For instance, the value of Ptr0 was 37 at the checkpoint 800, and the two deltas 802a, 802b add values of '0' and '1' respectively for a total of 38 in the reconstructed values 804. The value of Ptr1 was 0 and the two deltas 802a, 802b add values of '0' and '0' for Ptr1 for a total of 0 in the reconstructed value of Ptr1. As a third example, the value of Ptr2 in the checkpoint 800 is 105. The two deltas 802a, 802b add values of '1' and '1' for a total of 107 in the reconstructed values 804.

It will be appreciated that the storage requirements for this process remain quite large. In particular, the pointers should be able to be rewound to any instruction that is unresolved. If the oldest unresolved instruction is 100 instructions old then it may be necessary to store history extending back 100 instructions. In practice, the storage requirements for the pointer history can exceed 6000 bits, which is both large and expensive. Even the storage for the current pointer values themselves use (in this example) 144 bits.

The present technique recognises that some pointer values can be inferred from other pointer values and it is therefore unnecessary to store all pointer values (either their current values or their historic values) since some can be inferred.

Figure 18:
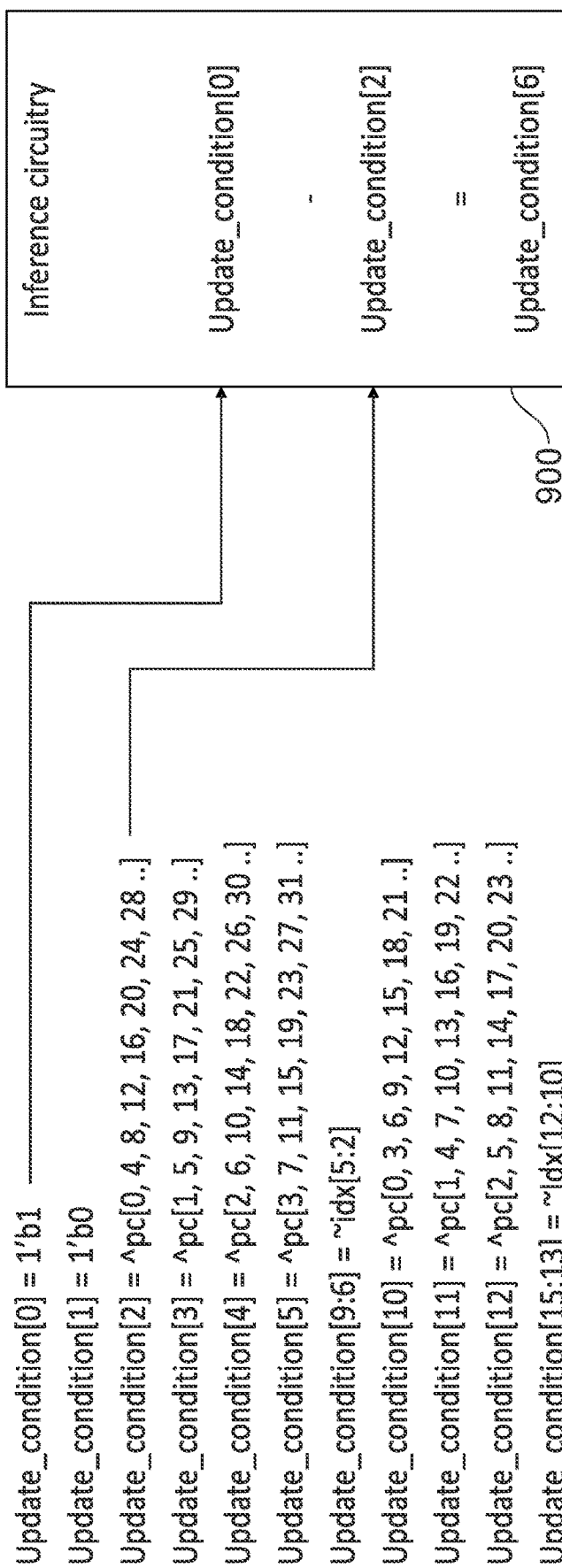
FIG. 18 illustrates the deduction of pointer values.

For instance, as shown in FIG. 18, since update condition 6 is the inverse of update condition 2, it is possible to deduce the value of Ptr6 by subtracting the value of Ptr2 from the value of Ptr0. Inference circuitry 900 subtracts the number of backwards taken branches encountered whose PC value is a multiple of 4 from the total number of backwards taken branches encountered. This will leave the number of backwards taken branches encountered whose PC value is not a multiple of 4, which is the update condition 6.

In general, any update condition A that is the inverse of another update condition B (e.g. one of the two associated counters will be updated each time the relevant type of instruction is encountered) can be deduced by looking at the counter of the number of times the relevant type of instruction is encountered and subtracting the pointer value for condition B. It is therefore not necessary for every pointer value to be stored. This extends also to the pointer value history. In particular a previous value of the pointer can be deduced by knowing the previous value of the pointer value that is updated each time (i.e. Update_condition[0]) and the previous value of the inverse pointer value (e.g. pointer 2 to determine pointer 6). By recognising these 'duals' it is possible to reduce the storage requirements by about 50%.

Further improvements to storage requirements can be made by not having all update conditions (and associated pointers) active simultaneously. This technique recognises that some pointers may frequently be of little use in forming predictions.

Figure 19:
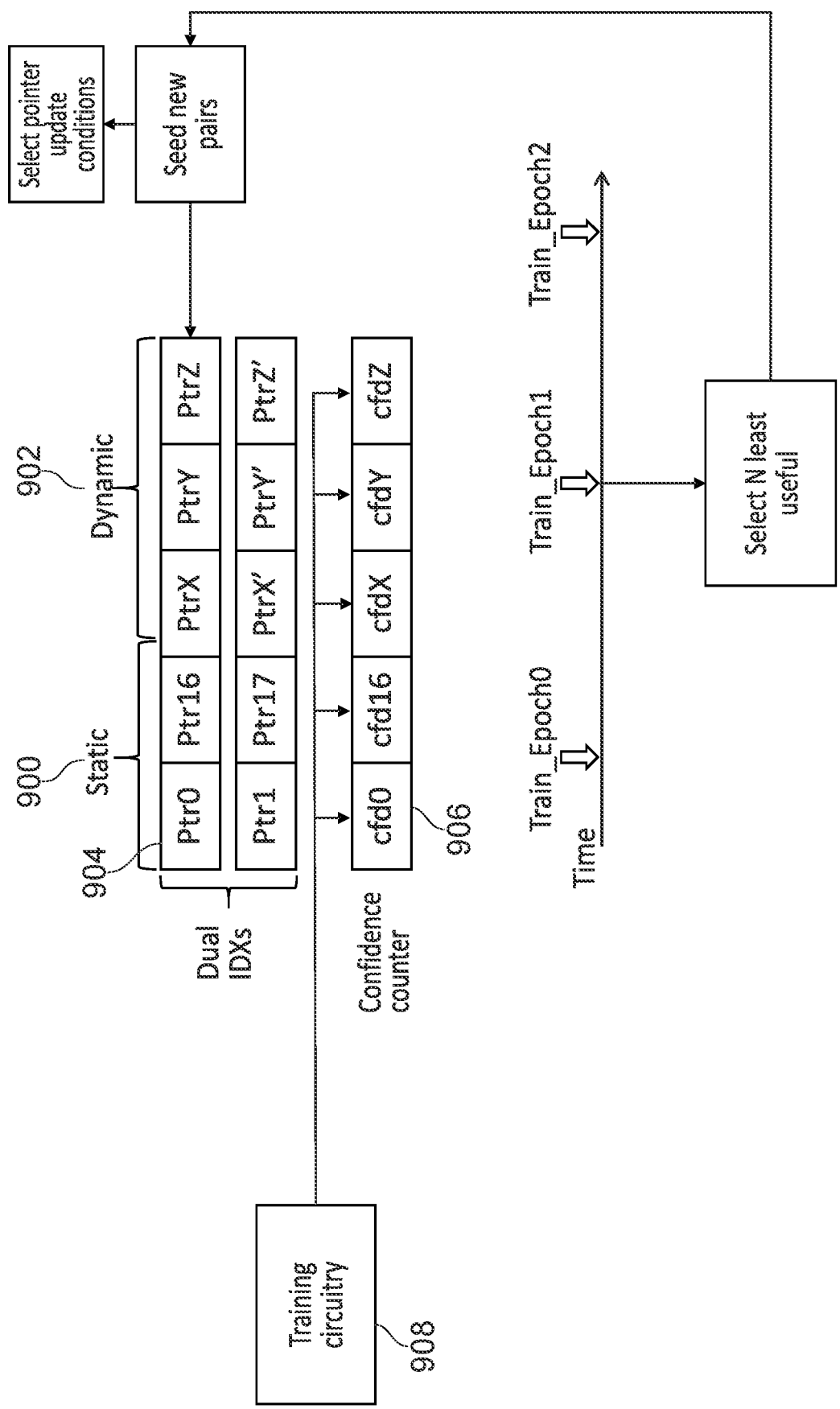
FIG. 19 illustrates an example that tracks a set of static pointers and a set of dynamic pointers.

FIG. 19 illustrates an example that tracks a set of static pointers 900 and a set of dynamic pointers 902. The static pointers are fixed and do not change at runtime. In contrast, the dynamic pointers 902 are changeable at runtime and are selected to reflect the pointer and pointer update conditions that produce a set of resolved behaviour that is most promising for making predictions (e.g. on HTP control flow instructions). In each case, the duals (the corresponding pointer values that can be inferred) are also shown. In this example, the previously described pointers Ptr0, Ptr1, Ptr16, and Ptr17 are collectively tracked (or inferred from a tracked pointer). In addition, three further pointer values are dynamically tracked based on their performance and a further three pointer values are inferred. As a consequence of this, it is only necessary to store data for five pointer values and their history, which therefore uses only 5/18ths of the 6000 bits required when all 18 counters are stored.

In the example of FIG. 19, a number of training epochs are shown. From one epoch to the next, N of the least useful dynamic pointers (PtrX, PtrY, PtrZ) are changed (the static pointers are kept the same). The duals also consequently change. N is an integer greater than one and less than the total number of dynamic pointer values held at once (three in this example). For instance, N could be one, allowing the better two pointer values and update conditions to be maintained and the least useful one to be rotated at each epoch. Having selected the N least useful pointer values, new pointer values (and their duals) are inserted into the set of (live) pointer values 904 (as has been previously embodied by reference numerals 120; 235). The pointer update conditions are also updated to match the pointer values that have been loaded. The selection of new pointer values may be those associated with update conditions that have not yet been active during a recent training epoch. In this way, every update condition will be tested, with the best two values being maintained at each stage. In some embodiments, training is continually performed. Therefore if a previously good pointer value and update condition has been found to be unsuccessful during a particular epoch then it may be removed and replaced with another one.

It will be appreciated that in these examples, it is only necessary to store historic data of pointer values that relate to the pointers that are live (e.g. PtrX, PtrY, PtrZ in FIG. 19). In doing so, the storage requirements can be reduced as compared to a situation where the historic data of all pointers (live and suspended) is stored.

In practice, replacing the update condition can be as simple as changing a program counter mask used to determine whether a counter value should be incremented and resolved behaviour stored. Also at each epoch, the resolved behaviours are reset for at least the update conditions that are changed. This is because otherwise the resolved behaviours that are already stored will relate to resolved behaviours that may not be stored in the new epoch. For instance, if PtrZ previously related to a pointer for Update_condition[2] then the stored resolved behaviour would not match if this was changed to Update_condition[14].

In the above description, reference has been made to more/less useful pointers and their associated pointer update conditions. This can be measured using confidence counters 906 updated by training circuitry 908. There are a number of ways in which the confidence can be measured. However, in some examples, this might represent the number of times the pointer and its associated set of resolved behaviour (historical information) has been determined to be the best predictor of future behaviour of a control flow instruction during the current training epoch. That is, Ptr0 is used to refer to a set of historical information of control flow instructions. If that particular set of information is found to be the best set of historical information for predicting the behaviour of a control flow instruction P, then cfd0 is incremented. In contrast, Ptr6 (as PtrX) may point to a different set of historical information of control flow instructions (filtered differently to the set of historical information to which Ptr0 points). If that set of historical information is found to be the best set of historical information for predicting the behaviour of a control flow instruction Q, then cfd6 is incremented. The confidence counters can be reset at the end of each epoch. In some examples, the training circuitry 908 could store data over a number of epochs and this can be used to influence which pointer values (and update conditions) are swapped in. For instance, a suspended pointer value and update condition that has been shown, over an extended period, to be successful might be swapped in more readily than a suspended pointer value and update condition that generally performs worse.

In some of the above examples, training for only one HTP branch instruction is performed at a time. Where this is carried out, the training epoch will clearly need to be larger than the time taken to perform training of several HTP branch instructions in order for it to be determined which of the sets of resolved behaviours/pointers is best at producing predictions.

Figure 20:
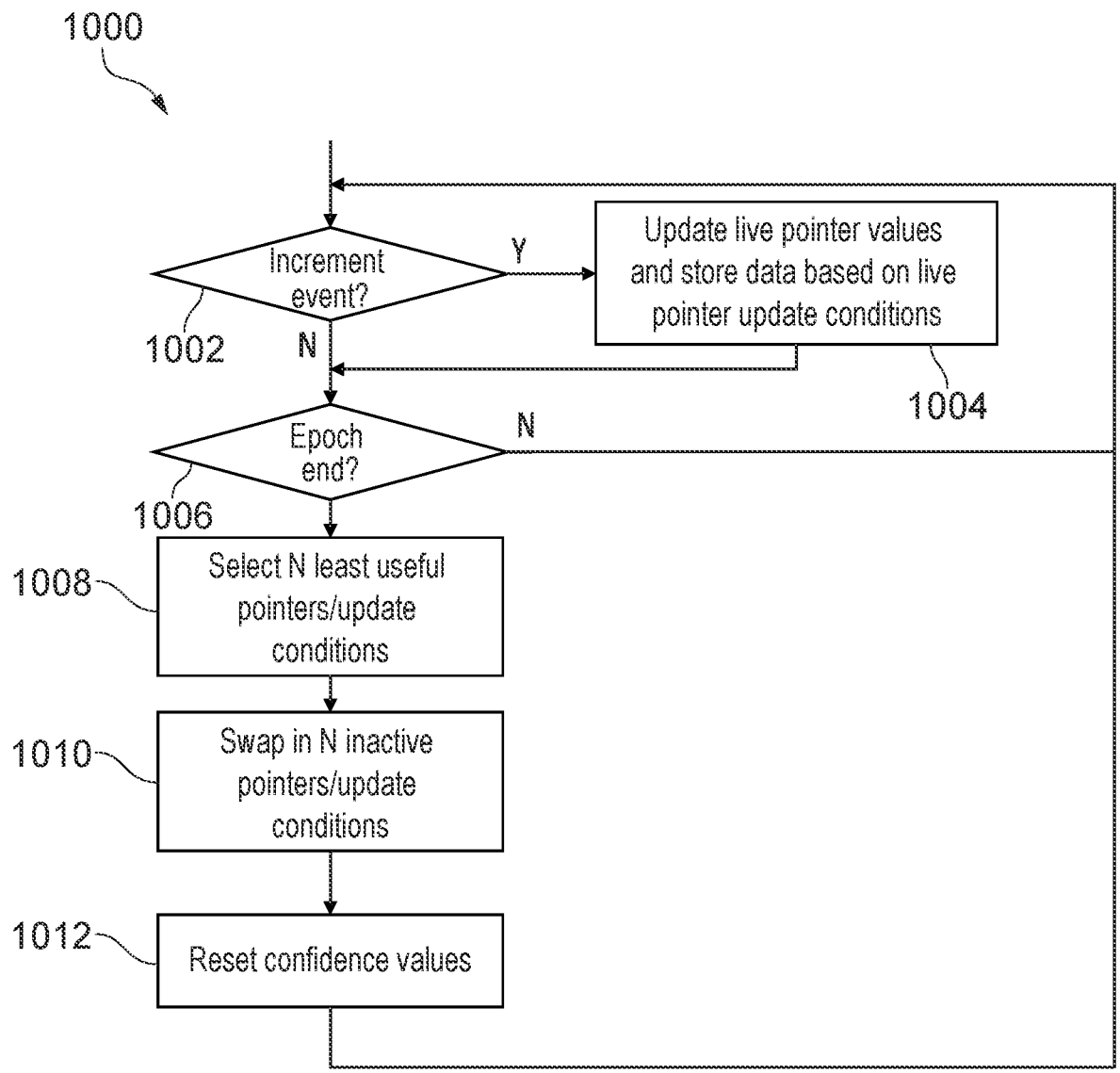
FIG. 20 shows a flowchart that shows a method of data processing in accordance with some examples.

FIG. 20 shows a flowchart 1000 that shows a method of data processing in accordance with some examples. At a step 1002, it is determined whether an increment event has occurred. For instance, this might be the occurrence of a backwards taken branch. If so, then at step 1004, any (live) pointer values are updated (and data relating to the backwards taken branch) are stored in each set of data in accordance with the pointer update conditions for that set. In any event, at step 1006, it is determined whether the epoch has ended or not. If not, then the process returns to step 1002. Otherwise at step 1008, the N least useful pointers/update conditions are selected and at step 1010, N replacements are selected. Then at step 1012, the confidence values for the currently selected pointer values/update conditions are reset. The process then returns to step 1002.

Separate to this, predictions are made based on the sets of data that are currently active. If an active set of data is determined to be the best for making a prediction (e.g. for a control flow instruction) then the confidence value associated with that set (or associated with the pointer used by that set) is incremented.

Concepts described herein may be embodied in a system comprising at least one packaged chip. The apparatus described earlier can be implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 21:
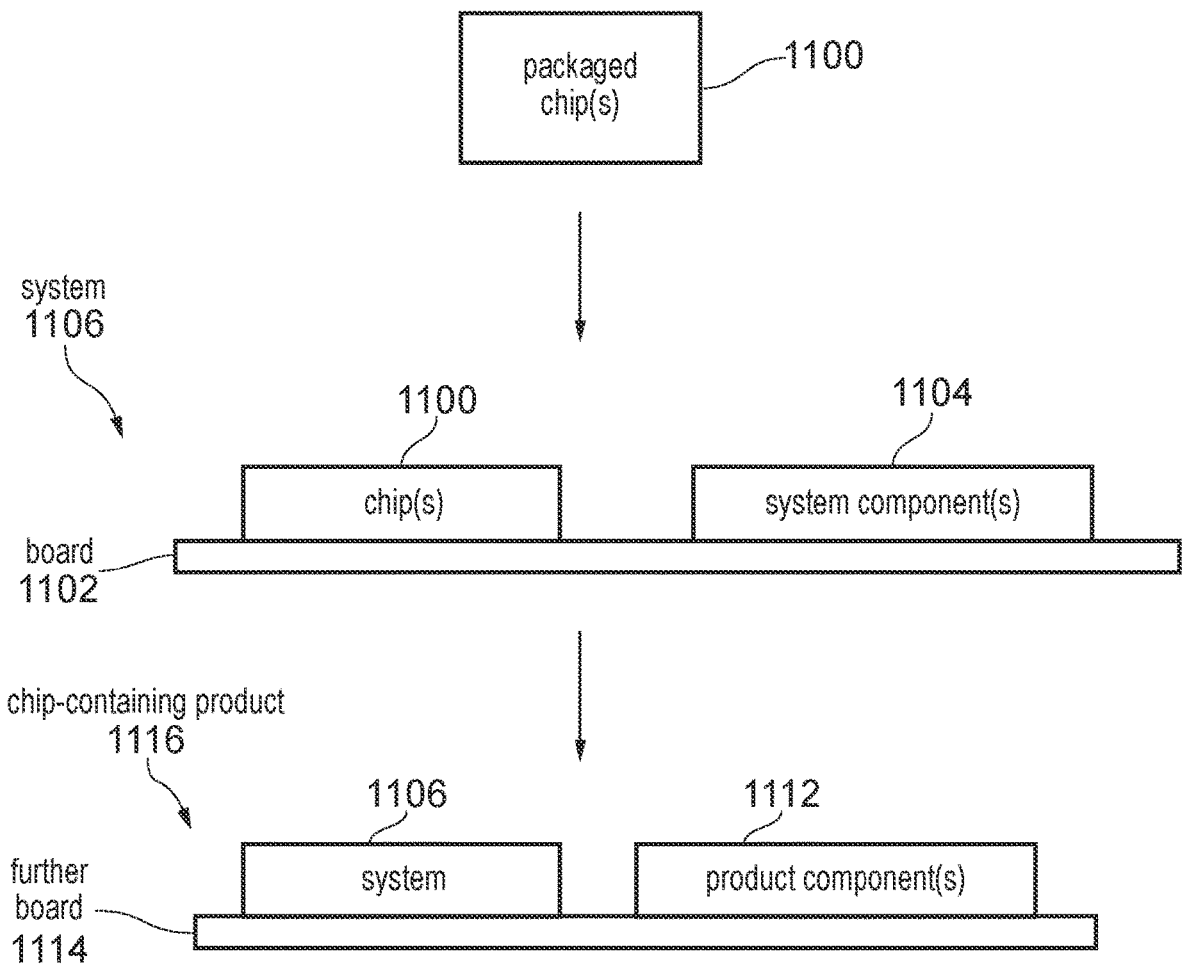
FIG. 21 illustrates an example of a system and chip-containing product.

As shown in FIG. 21, one or more packaged chips 1100, with the apparatus described above implemented on one chip or distributed over two or more of the chips, are manufactured by a semiconductor chip manufacturer. In some examples, the chip product 1100 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 1100 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 1100 are assembled on a board 1102 together with at least one system component 1104 to provide a system 1106. For example, the board may comprise a printed circuit board. The board substrate may be made of any of a variety of materials, e.g. plastic, glass, ceramic, or a flexible substrate material such as paper, plastic or textile material. The at least one system component 1104 comprise one or more external components which are not part of the one or more packaged chip(s) 1100. For example, the at least one system component 1104 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 1116 is manufactured comprising the system 1106 (including the board 1102, the one or more chips 1100 and the at least one system component 1104) and one or more product components 1112. The product components 1112 comprise one or more further components which are not part of the system 1106. As a non-exhaustive list of examples, the one or more product components 1112 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 1106 and one or more product components 1112 may be assembled on to a further board 1114.

The board 1102 or the further board 1114 may be provided on or within a device housing or other structural support (e.g. a frame or blade) to provide a product which can be handled by a user and/or is intended for operational use by a person or company.

The system 1106 or the chip-containing product 1116 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The present technique could be configured as follows.

1. A data processing apparatus comprising:
   pointer storage configured to store pointer values for a plurality of pointers;
   increment circuitry, responsive to one or more increment events, to increment each of the pointer values in dependence on a corresponding live pointer value update condition from a plurality of corresponding live pointer value update conditions, wherein the corresponding live pointer value update condition is different for each of the pointers; and
   history storage circuitry configured to store resolved behaviours of instances of a control flow instruction, each of the resolved behaviours being associated with one of the pointers, wherein
   at least one of the live pointer value update conditions is changeable at runtime.

2. The data processing apparatus according to clause 1, wherein
   at least one other of the live pointer value update conditions is immutable at runtime.

3. The data processing apparatus according to any preceding clause, wherein
   the at least one of the live pointer value update conditions is based on a program counter value.

4. The data processing apparatus according clause 3, wherein
   the at least one of the live pointer value update conditions is based on the current program counter value matching a corresponding pattern.

5. The data processing apparatus according to clause 4, wherein
   the at least one of the live pointer value update conditions is changed by changing the corresponding pattern.

6. The data processing apparatus according to any preceding clause, wherein
   the one or more increment events comprise a backwards taken branch.

7. The data processing apparatus according to any preceding clause, wherein
   the live pointer value update condition is based on a type of the backwards taken branch.

8. The data processing apparatus according to any preceding clause, comprising:
   counter storage circuitry configured to store confidence values, each of the confidence values corresponding with one of the live pointer value update conditions, wherein
   each of the at least some of the live pointer value update conditions are changed in dependence on its corresponding confidence value.

9. The data processing apparatus according to clause 8, wherein
   each of the at least some of the live pointer value update conditions are changed in dependence on its corresponding confidence value being less than a predetermined limit after a predetermined period.

10. The data processing apparatus according to clause 8, wherein
    each of the at least some of the live pointer value update conditions are changed as a consequence of being in a smallest N of the confidence values stored in the counter storage circuitry.

11. The data processing apparatus according to any one of clauses 8-10, comprising:
    prediction circuitry, responsive to a prediction trigger associated with a replay of a given instance of a given control flow instruction, to select a subset of resolved behaviour associated with one of the pointer values to make a prediction of a given instance of the given control flow instruction.

12. The data processing apparatus according to clause 11, comprising:
    training circuitry configured, in response to the subset of resolved behaviour being used to make the prediction, to increment its corresponding confidence value.

13. The data processing apparatus according to any preceding clause, wherein
    the live pointer value update conditions and at least one suspended pointer value update conditions form a superset of available pointer value update conditions; and
    the at least one of the live pointer value update conditions is changeable to one of the at least one suspended pointer value update conditions.

14. The data processing apparatus according to any preceding clause, comprising:
    recovery circuitry configured to recover a previous value of the pointer values for each of the live pointer value update conditions, wherein
    the history storage circuitry is configured to store the previous value of the pointer values for each of the live pointer value update conditions.

15. The data processing apparatus according to any preceding clause, comprising:
    inference circuitry configured to infer an inferred pointer value from an inferring pointer value corresponding to one of the live pointer value update conditions.

16. The data processing apparatus according to clause 15, wherein the inferred pointer value corresponds with one of the pointer value update conditions that is an inverse of the one of the active pointer update conditions.

17. A system comprising:
    the data processing apparatus of any preceding clause, implemented in at least one packaged chip;
    at least one system component; and
    a board, wherein
    the at least one packaged chip and the at least one system component are assembled on the board.

18. A chip-containing product comprising the system of clause 17 assembled on a further board with at least one other product component.

19. A data processing method comprising:
  storing pointer values for a plurality of pointers;
  responding to one or more increment events by incrementing each of the pointer values in dependence on a corresponding live pointer value update condition from a plurality of corresponding live pointer value update conditions, wherein the corresponding live pointer value update condition is different for each of the pointers; and
  storing resolved behaviours of instances of a control flow instruction, each of the sets being associated with one of the pointers, wherein
  at least one of the live pointer value update conditions is changeable at runtime.

20. A non-transitory computer-readable medium to store computer-readable code for fabrication of a data processing apparatus comprising:
  pointer storage configured to store pointer values for a plurality of pointers;
  increment circuitry, responsive to one or more increment events, to increment each of the pointer values in dependence on a corresponding live pointer value update condition from a plurality of corresponding live pointer value update conditions, wherein the corresponding live pointer value update condition is different for each of the pointers; and
  history storage circuitry configured to store resolved behaviours of instances of a control flow instruction, each of the sets being associated with one of the pointers, wherein
  at least one of the live pointer value update conditions is changeable at runtime.

We claim:

1. A data processing apparatus comprising:
  pointer storage configured to store pointer values for a plurality of pointers;
  increment circuitry, responsive to one or more increment events, to increment each of the pointer values in dependence on a corresponding live pointer value update condition from a plurality of corresponding live pointer value update conditions, wherein the corresponding live pointer value update condition is different for each of the pointers; and
  history storage circuitry configured to store resolved behaviours of instances of a control flow instruction, each of the resolved behaviours being associated with one of the pointers, wherein
  at least one of the live pointer value update conditions is changeable at runtime.

2. The data processing apparatus according to claim 1, wherein
  at least one other of the live pointer value update conditions is immutable at runtime.

3. The data processing apparatus according to claim 1, wherein
  the at least one of the live pointer value update conditions is based on a program counter value.

4. The data processing apparatus according claim 3, wherein
  the at least one of the live pointer value update conditions is based on the current program counter value matching a corresponding pattern.

5. The data processing apparatus according to claim 4, wherein
  the at least one of the live pointer value update conditions is changed by changing the corresponding pattern.

6. The data processing apparatus according to claim 1, wherein
  the one or more increment events comprise a backwards taken branch.

7. The data processing apparatus according to claim 1, wherein
  the live pointer value update condition is based on a type of the backwards taken branch.

8. The data processing apparatus according to claim 1, comprising:
  counter storage circuitry configured to store confidence values, each of the confidence values corresponding with one of the live pointer value update conditions, wherein
  each of the at least some of the live pointer value update conditions are changed in dependence on its corresponding confidence value.

9. The data processing apparatus according to claim 8, wherein
  each of the at least some of the live pointer value update conditions are changed in dependence on its corresponding confidence value being less than a predetermined limit after a predetermined period.

10. The data processing apparatus according to claim 8, wherein
  each of the at least some of the live pointer value update conditions are changed as a consequence of being in a smallest N of the confidence values stored in the counter storage circuitry.

11. The data processing apparatus according to claim 8, comprising:
  prediction circuitry, responsive to a prediction trigger associated with a replay of a given instance of a given control flow instruction, to select a subset of resolved behaviour associated with one of the pointer values to make a prediction of a given instance of the given control flow instruction.

12. The data processing apparatus according to claim 11, comprising:
  training circuitry configured, in response to the subset of resolved behaviour being used to make the prediction, to increment its corresponding confidence value.

13. The data processing apparatus according to claim 1, wherein
  the live pointer value update conditions and at least one suspended pointer value update conditions form a superset of available pointer value update conditions; and
  the at least one of the live pointer value update conditions is changeable to one of the at least one suspended pointer value update conditions.

14. The data processing apparatus according to claim 1, comprising:
  recovery circuitry configured to recover a previous value of the pointer values for each of the live pointer value update conditions, wherein
  the history storage circuitry is configured to store the previous value of the pointer values for each of the live pointer value update conditions.

15. The data processing apparatus according to claim 1, comprising:
  inference circuitry configured to infer an inferred pointer value from an inferring pointer value corresponding to one of the live pointer value update conditions.

16. The data processing apparatus according to claim 15, wherein
the inferred pointer value corresponds with one of the pointer value update conditions that is an inverse of the one of the active pointer update conditions.

17. A system comprising:
the data processing apparatus of claim 1, implemented in at least one packaged chip;
at least one system component; and
a board, wherein
the at least one packaged chip and the at least one system component are assembled on the board.

18. A chip-containing product comprising the system of claim 17 assembled on a further board with at least one other product component.

19. A data processing method comprising:
storing pointer values for a plurality of pointers;
responding to one or more increment events by incrementing each of the pointer values in dependence on a corresponding live pointer value update condition from a plurality of corresponding live pointer value update conditions, wherein the corresponding live pointer value update condition is different for each of the pointers; and
storing resolved behaviours of instances of a control flow instruction, each of the sets being associated with one of the pointers, wherein
at least one of the live pointer value update conditions is changeable at runtime.

20. A non-transitory computer-readable medium to store computer-readable code for fabrication of a data processing apparatus comprising:
pointer storage configured to store pointer values for a plurality of pointers;
increment circuitry, responsive to one or more increment events, to increment each of the pointer values in dependence on a corresponding live pointer value update condition from a plurality of corresponding live pointer value update conditions, wherein the corresponding live pointer value update condition is different for each of the pointers; and
history storage circuitry configured to store resolved behaviours of instances of a control flow instruction, each of the sets being associated with one of the pointers, wherein
at least one of the live pointer value update conditions is changeable at runtime.

* * * * *